US011215908B2

(12) United States Patent
Yanagisawa

(10) Patent No.: US 11,215,908 B2
(45) Date of Patent: Jan. 4, 2022

(54) LENS UNIT, PROJECTION OPTICAL SYSTEM, AND PROJECTOR

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/126,701

(22) Filed: Dec. 18, 2020

(65) Prior Publication Data

US 2021/0191239 A1 Jun. 24, 2021

(30) Foreign Application Priority Data

Dec. 19, 2019 (JP) .............................. JP2019-228986

(51) Int. Cl.
*G03B 21/14* (2006.01)
*G02B 13/00* (2006.01)

(52) U.S. Cl.
CPC ....... *G03B 21/142* (2013.01); *G02B 13/0095* (2013.01); *G03B 21/145* (2013.01)

(58) Field of Classification Search
CPC .... G03B 21/14; G03B 21/142; G03B 21/145; G02B 7/021; G02B 7/025; G02B 7/04; G02B 9/12; G02B 13/0095
USPC ....... 359/676, 694, 695, 701, 823, 825, 830; 353/10
See application file for complete search history.

(56) References Cited

U.S. PATENT DOCUMENTS

| 6,816,322 | B2 | 11/2004 | Abe et al. | |
|---|---|---|---|---|
| 7,048,388 | B2 | 5/2006 | Takaura et al. | |
| 7,549,755 | B2 | 6/2009 | Suzuki | |
| 8,934,183 | B2 * | 1/2015 | Maetaki | G02B 9/12 359/797 |
| 2003/0086184 | A1 | 5/2003 | Abe et al. | |
| 2004/0156117 | A1 | 8/2004 | Takaura et al. | |
| 2006/0193036 | A1 | 8/2006 | Suzuki | |
| 2010/0116973 | A1 | 5/2010 | Maetaki | |
| 2014/0204481 | A1 * | 7/2014 | Chang | G02B 7/021 359/793 |
| 2018/0321457 | A1 * | 11/2018 | Symmons | G02B 7/028 |

(Continued)

FOREIGN PATENT DOCUMENTS

| JP | H06-347612 A | 12/1994 |
|---|---|---|
| JP | 2003-140037 A | 5/2003 |
| JP | 2004-246042 A | 9/2004 |

(Continued)

*Primary Examiner* — William C. Dowling
(74) *Attorney, Agent, or Firm* — Oliff PLC

(57) ABSTRACT

The lens unit includes a jointed lens having a first optical member, a second optical member disposed on an optical axis of the first optical member, and a jointing member having a light transmissive property and disposed between the first optical member and the second optical member, and an adjustment mechanism holding the first optical member and the second optical member and adjusting a distance between the first optical member and the second optical member along an optical axis direction. The jointing member adheres to the first optical member and the second optical member in a deformable manner. The adjustment mechanism adjusts the distance to change the thickness of the jointing member along the optical axis direction.

14 Claims, 26 Drawing Sheets

(56) References Cited

U.S. PATENT DOCUMENTS

2019/0011684 A1  1/2019 Ishihara et al.
2021/0191092 A1* 6/2021 Yanagisawa ........... G02B 7/026

FOREIGN PATENT DOCUMENTS

| JP | 2006-235516 A | 9/2006 |
| JP | 2007-316674 A | 12/2007 |
| JP | 2010-117472 A | 5/2010 |
| JP | 2010-224205 A | 10/2010 |
| JP | 2010-266496 A | 11/2010 |
| JP | 2011-053332 A | 3/2011 |
| JP | 2017-156712 A | 9/2017 |
| JP | 2017-156713 A | 9/2017 |
| JP | 2017-156714 A | 9/2017 |
| JP | 2019-133061 A | 8/2019 |
| JP | 2020-194115 A | 12/2020 |

* cited by examiner

LENS UNIT, PROJECTION OPTICAL SYSTEM, AND PROJECTOR

The present application is based on, and claims priority from JP Application Serial Number 2019-228986, filed Dec. 19, 2019, the disclosure of which is hereby incorporated by reference herein in its entirety.

BACKGROUND

1. Technical Field

The present disclosure relates to a lens unit, a projection optical system, and a projector.

2. Related Art

A jointed lens which can be adopted as a lens which constitutes a projection optical system is described in JP-A-2003-140037 (Document 1), JP-A-2010-266496 (Document 2), JP-A-2011-053332 (document 3), and JP-A-06-347612 (Document 4). Document 1 discloses a jointed lens obtained by jointing two or three lenses to each other with an adhesive. In Document 1, the curvature radius of the joint surface of the two lenses adjacent to each other is specified to thereby prevent the two lenses from being separated from each other. Document 2 discloses a jointed lens obtained by jointing two lenses to each other with resin. In Document 2, the thermal expansion coefficients of the lenses and the resin are specified to thereby prevent the stress from occurring. Document 3 discloses a jointed lens obtained by jointing two lenses to each other with resin. In Document 3, a tilted surface part is provided outside the effective diameter of each lens. In Document 3, the two lenses are made to have contact with each other via the tilted surface part to thereby make the optical axes of the two lenses coincide with each other. Document 4 discloses a jointed lens obtained by jointing two lenses to each other with an adhesive. In Document 4, a planar section in a direction perpendicular to a surface axis is disposed outside the effective diameter of each of the lenses. In Document 4, the two lenses are bonded to each other with reference to the planar sections to thereby prevent each of the lenses from tilting.

There is proposed no mechanism for adjusting the thickness in the optical axis direction of the jointed lens after manufacturing the jointed lens.

SUMMARY

In view of the problems described above, a lens unit according to the present disclosure includes a jointed lens having a first optical member, a second optical member disposed on an optical axis of the first optical member, and a jointing member having a light transmissive property and disposed between the first optical member and the second optical member, and an adjustment mechanism holding the first optical member and the second optical member and adjusting a distance between the first optical member and the second optical member along an optical axis direction of the optical axis. The jointing member adheres to the first optical member and the second optical member in a deformable manner. The adjustment mechanism adjusts the distance to change a thickness of the jointing member along the optical axis direction.

A projection optical system according to the present disclosure includes the lens unit described above disposed between a reduction-side imaging plane and an enlargement-side imaging plane.

A projector according to the present disclosure includes a light source, a light modulator configured to modulate light emitted from the light source to provide an image to the reduction-side imaging plane, and the projection optical system described above configured to project the image.

DESCRIPTION OF AN EXEMPLARY EMBODIMENT

A lens unit, a projection optical system, and a projector according to an embodiment of the present disclosure will hereinafter be described with reference to the drawings. First, an example of a lens unit adoptable to the projection optical system will hereinafter be described. Then, an overall configuration of the projector will be described. Subsequently, a projection optical system equipped with the lens unit will be described as an example of the projection optical system which can be installed in the projector.

Lens Unit According to Practical Example 1

Figure 1:
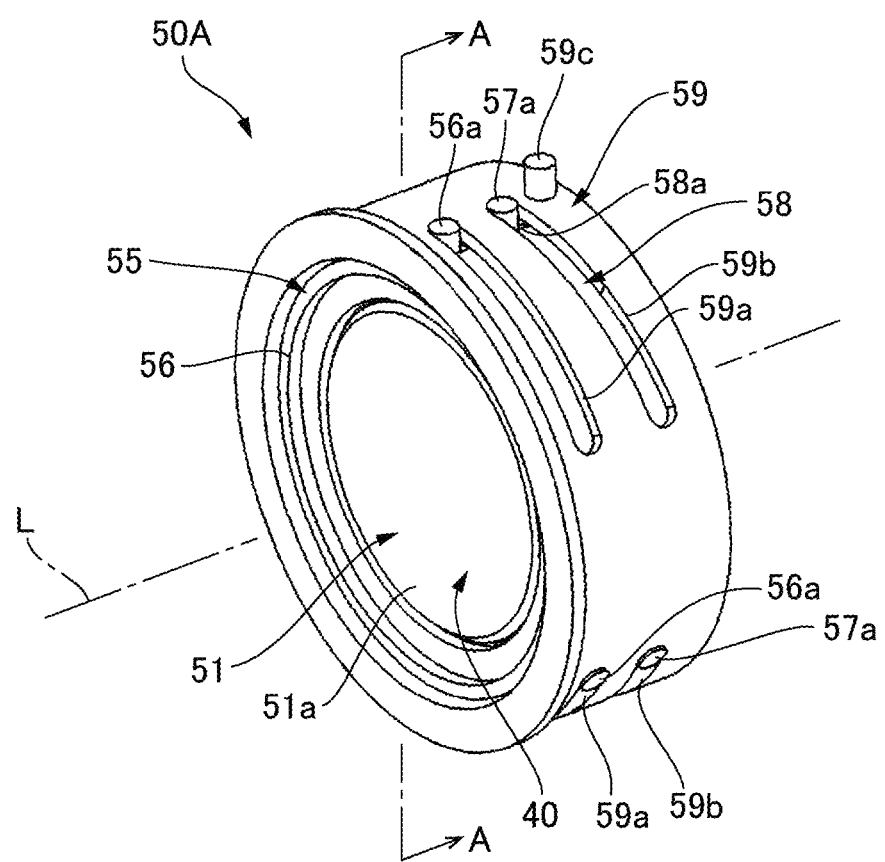
FIG. 1 is a perspective view of a lens unit according to Practical Example 1.
Figure 2:
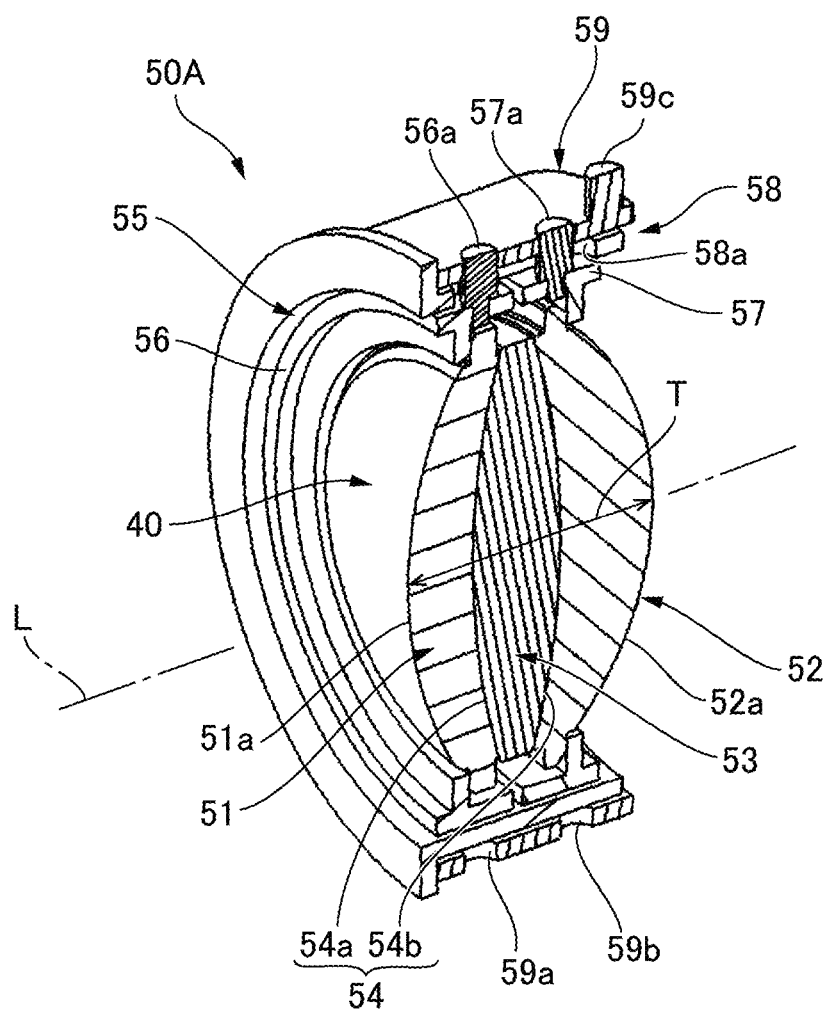
FIG. 2 is a perspective view of the lens unit shown in FIG. 1 when being cut along the line A-A.
Figure 3:
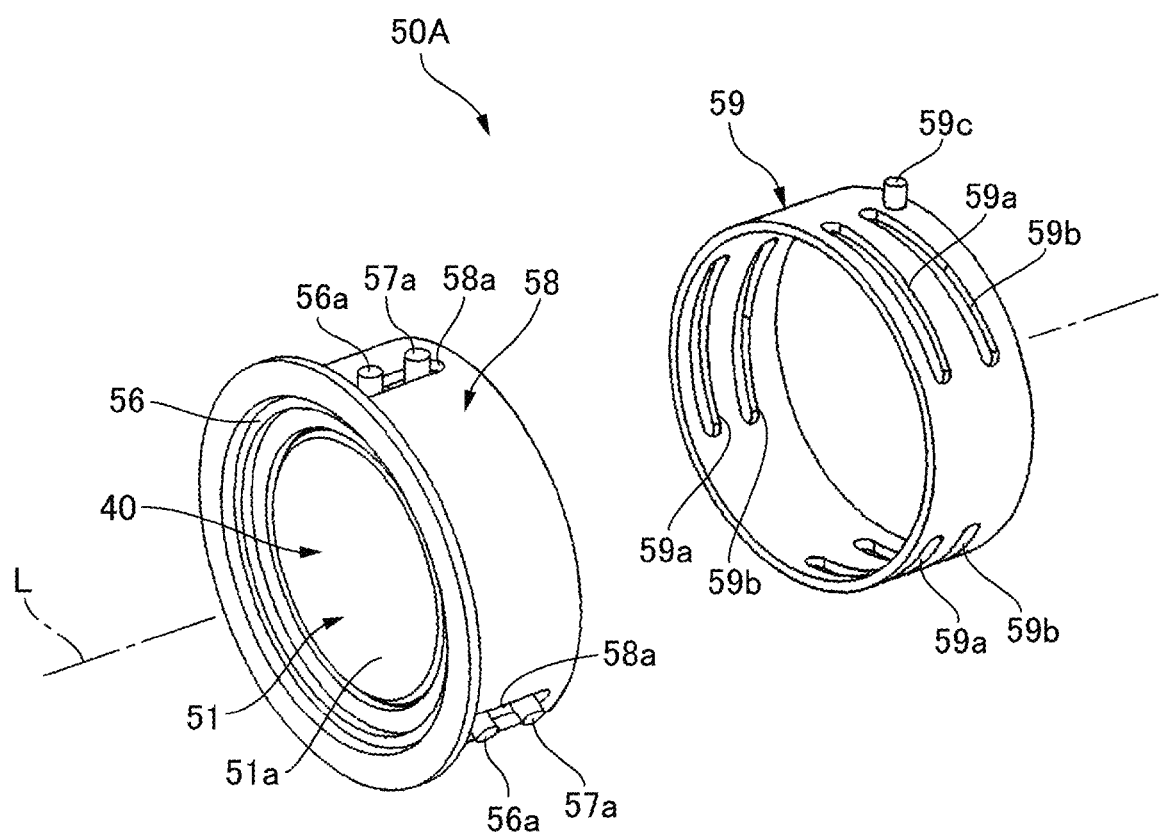
FIG. 3 is an exploded perspective view of the lens unit shown in FIG. 1.
Figure 4:
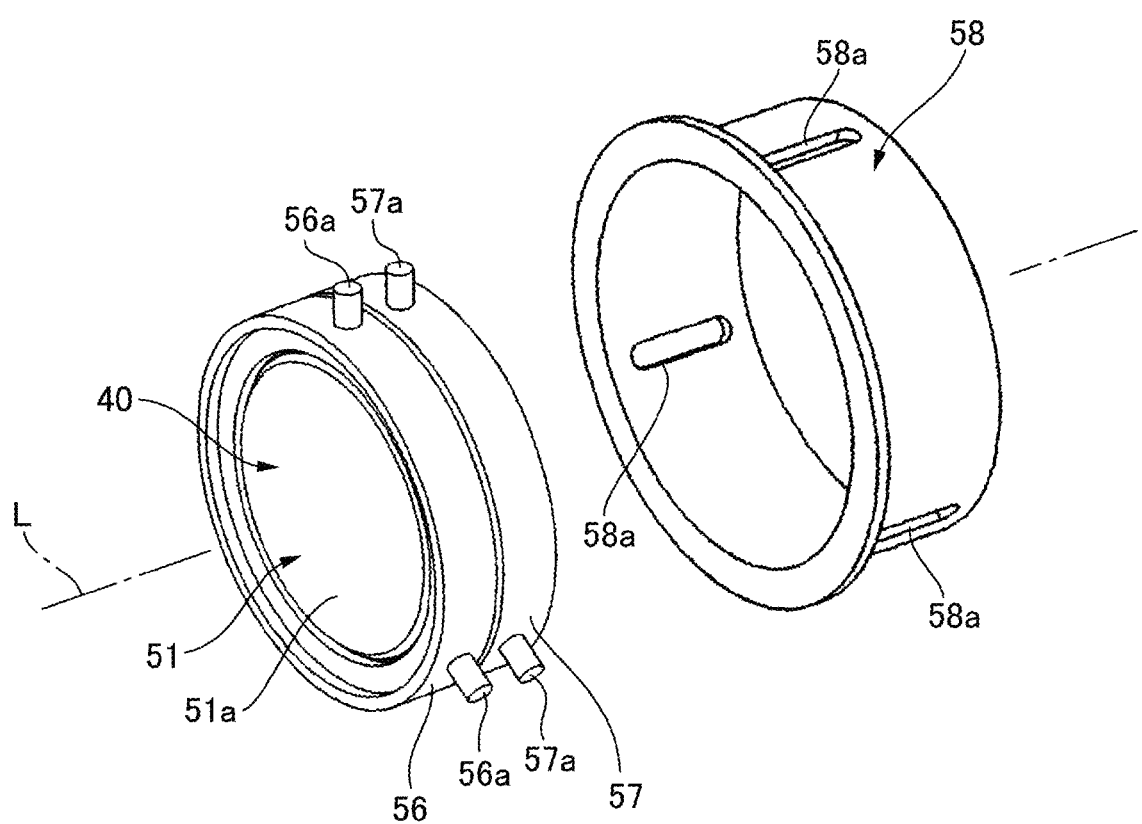
FIG. 4 is an exploded perspective view of the lens unit in the state in which a second member is detached.

FIG. 1 is a perspective view of a lens unit according to Practical Example 1. FIG. 2 is a perspective view of the lens unit shown in FIG. 1 when being cut along the line A-A. FIG. 3 is an exploded perspective view of the lens unit shown in FIG. 1. FIG. 4 is an exploded perspective view of the lens unit in the state in which a second member is detached. As shown in FIG. 1, the lens unit 50A according to Practical Example 1 has a jointed lens 40 and an adjustment mechanism 55.

As optical members, the jointed lens 40 is provided with a first lens 51, a second lens 52 arranged on an optical axis L of the first lens 51, and a third lens 53 disposed between the first lens 51 and the second lens 52. Further, the jointed lens 40 is provided with a jointing member 54 which has a light transmissive property, and is located between the first lens and the second lens 52. The jointing member 54 is elastically deformable, and adheres to the two lenses located before and after the jointing member 54 in the optical axis L direction. In the present example, as the jointing member 54, there are provided a first jointing member 54a and a second jointing member 54b, wherein the first jointing member 54a is located between the first lens 51 and the third lens 53, and adheres to the first lens 51 and the third lens 53, and the second jointing member 54b is located between the third lens 53 and the second lens 52, and adheres to the third lens 53 and the second lens 52. In the present example, the jointing member 54 is an adhesive. As the jointing member 54, a gel resin member can be adopted.

The adjustment mechanism 55 holds the first lens 51 and the second lens 52 in the state in which the distance in the optical axis L direction between the first lens 51 and the second lens 52 can be adjusted. The adjustment mechanism 55 relatively moves the first lens 51 and the second lens 52 in the optical axis L direction to thereby adjust the distance T between a first-lens lateral surface 51a at an opposite side to the second lens 52 in the first lens 51 and a second-lens lateral surface 52a at an opposite side to the first lens 51 in the second lens 52, and then keeps them in the adjusted state.

The adjustment mechanism 55 has a first ring 56 for holding the first lens 51 at the inner circumferential side, a second ring 57 for holding the second lens 52 at the inner circumferential side, a first member 58 disposed at an outer side in a radial direction of the first ring 56 and the second ring 57, and a second member 59 disposed at an outer side in a radial direction of the first member 58. The first ring 56 is provided with first cam pins 56a protruding toward the outer circumferential side. The second ring 57 is provided with second cam pins 57a protruding toward the outer circumferential side. The first cam pins 56a are fixed to the first ring 56 from an outer side in the radial direction. The second cam pins 57a are fixed to the second ring 57 from an outer side in the radial direction. The first cam pins 56a and the second cam pins 57a are each disposed at three places around the optical axis at regular angular intervals.

The first member 58 is wider in width in the optical axis L direction than the first ring 56 and the second ring 57. The first member 58 is provided with pin guide grooves 58a extending in the optical axis L direction. The pin guide grooves 58a are disposed at three places around the optical axis at regular angular intervals. The second member 59 is provided with first cam grooves 59a and second cam grooves 59b arranged in the optical axis L direction and extending in a circumferential direction. The first cam grooves 59a and the second cam grooves 59b increase in distance toward one side in the circumferential direction. The first cam grooves 59a are located at the outer side in the radial direction of the first ring 56, and extend along a virtual plane perpendicular to the optical axis. In contrast, the second cam grooves 59b are located by the outer side in the radial direction of the second ring 57, and extend obliquely to the optical axis L direction with respect to the virtual plane perpendicular to the optical axis. The first cam grooves 59a and the second cam grooves 59b are each disposed at three places around the optical axis at regular angular intervals. When disposing the second member 59 at the outer side in the radial direction of the first member 58, a set of the first cam groove 59a and the second cam groove 59b arranged in the optical axis L direction are arranged at angular positions overlapping the respective pin guide groove 58a. Further, the second member 59 is provided with a tab 59c protruding from one place in the circumferential direction toward the outer circumferential side.

The first cam pins 56a each penetrate the pin guide groove 58a, and are each inserted into the first cam groove 59a. The second cam pins 57a each penetrate the pin guide groove 58a, and are each inserted into the second cam groove 59b. Therefore, when relatively rotating the first member 58 and the second member 59 around the optical axis L, the distance in the optical axis L direction between the first lens 51 and the second lens 52 changes. In other words, when rotating the second member 59 with respect to the first member 58 using the tab 59c, the first cam pins 56a and the second cam pins 57a respectively move the first cam grooves 59a and the second cam grooves 59b in the state in which the displacement in the circumferential direction is restricted by the pin guide grooves 58a. Thus, the second lens 52 held by the second ring 57 having the second cam pins 57a protruding moves in the optical axis L direction with respect to the first lens 51 held by the first ring 56 having the first cam pins 56a protruding. Therefore, the distance between the first lens 51 and the second lens 52 changes. Therefore, the distance T between the first-lens lateral surface 51a at the opposite side to the second lens 52 in the first lens 51 and the second-lens lateral surface 52a at the opposite side to the first lens 51 in the second lens 52 changes.

Here, the first jointing member 54a and the second jointing member 54b are elastically deformable. Therefore, when the distance between the first lens 51 and the second lens 52 changes, the first jointing member 54a changes in the thickness in the optical axis L direction to keep the state of adhering to the first lens 51 and the third lens 53. Further, when the distance between the first lens 51 and the second lens 52 changes, the second jointing member 54b changes in the thickness in the optical axis L direction to keep the state of adhering to the third lens 53 and the second lens 52.

According to the present example, since the lens unit 50A is provided with the adjustment mechanism 55, it is possible to adjust the distance T between the first-lens lateral surface 51a of the first lens 51 and the second-lens lateral surface 52a of the second lens 52 by relatively moving the first lens 51 and the second lens 52 in the optical axis L direction. Further, due to the adjustment mechanism 55, the distance T between the first-lens lateral surface 51a and the second-lens lateral surface 52a can be kept in the adjusted state.

It should be noted that it is possible for the first member 58 to be provided with the first cam grooves 59a and the second cam grooves 59b extending in the circumferential direction, and it is possible for the second member 59 to be provided with the pin guide grooves 58a extending in the optical axis direction. In this case, the first cam pins 56a each penetrate the first cam groove 59a, and are each inserted into the pin guide groove 58a. The second cam pins 57a each penetrate the second cam groove 59b, and are each inserted into the pin guide groove 58a. Also in such a manner, when relatively rotating the first member 58 and the second member 59 around the optical axis, the distance in the optical axis direction between a first optical member and a second optical member changes.

Lens Unit According to Practical Example 2

Figure 5:
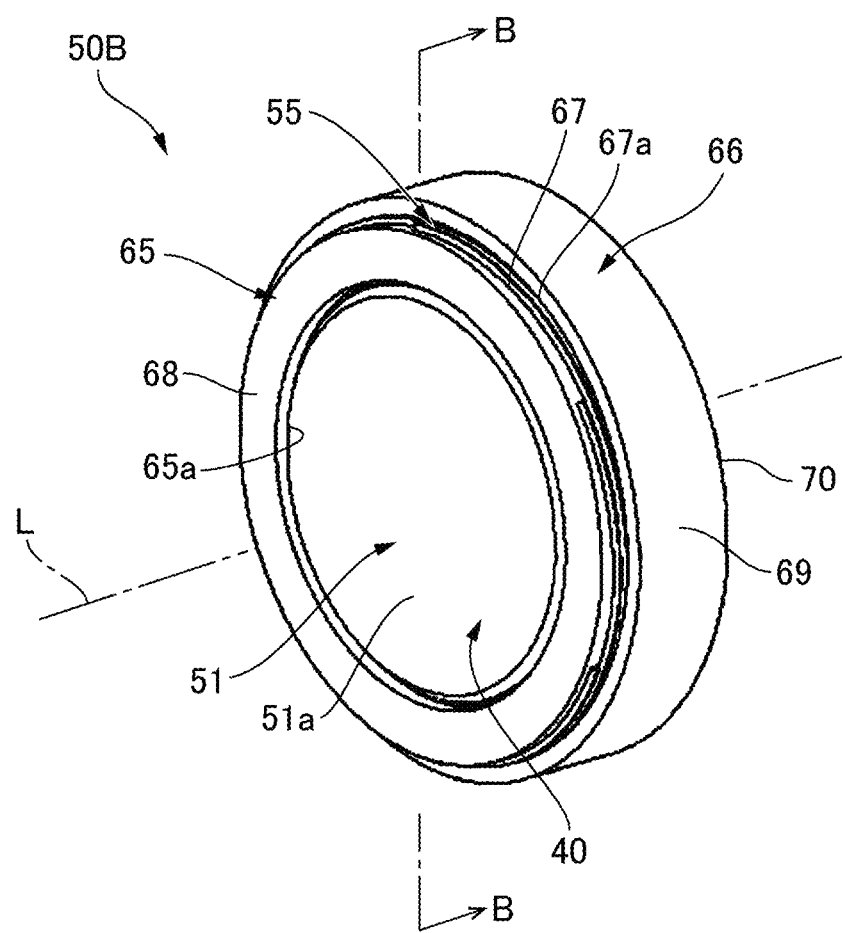
FIG. 5 is a perspective view of a lens unit according to Practical Example 2.
Figure 6:
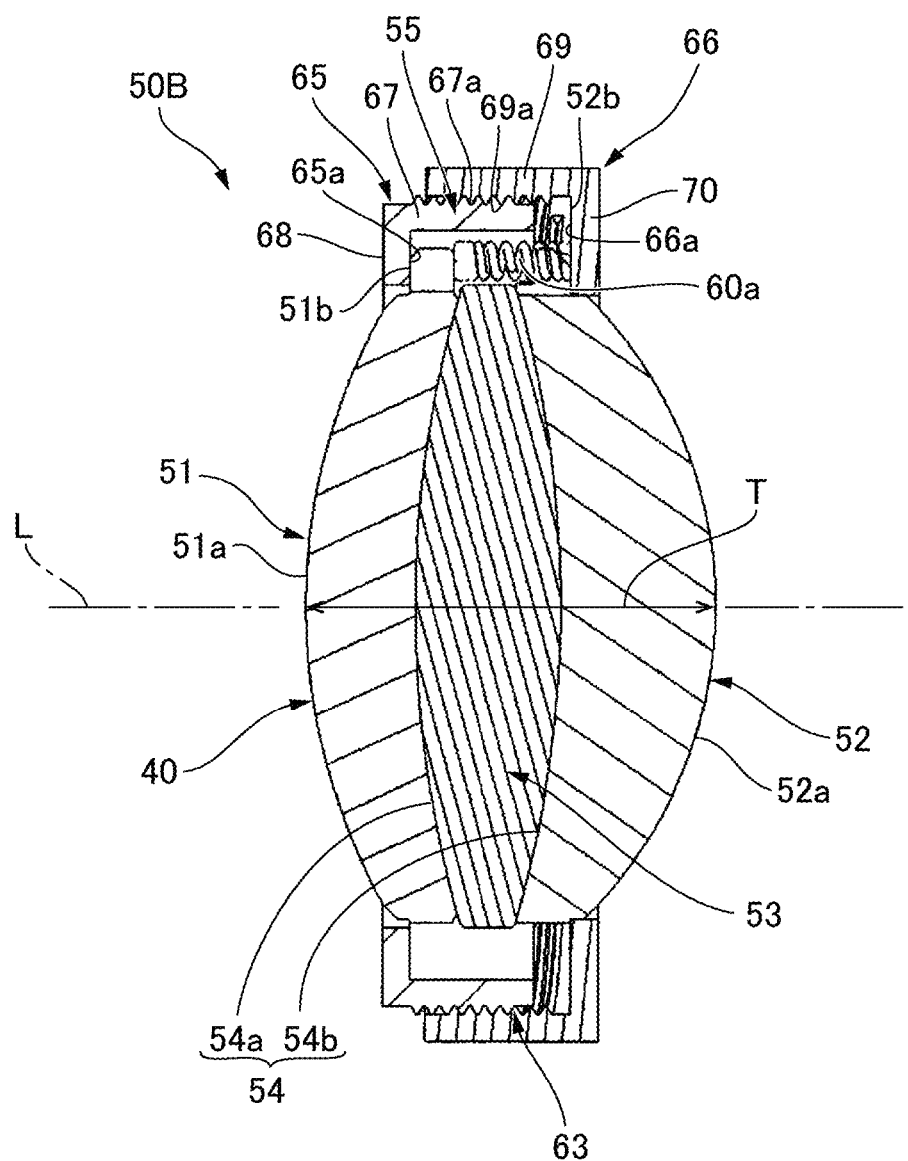
FIG. 6 is a cross-sectional view of the lens unit shown in FIG. 5 when being cut along the line B-B.
Figure 7:
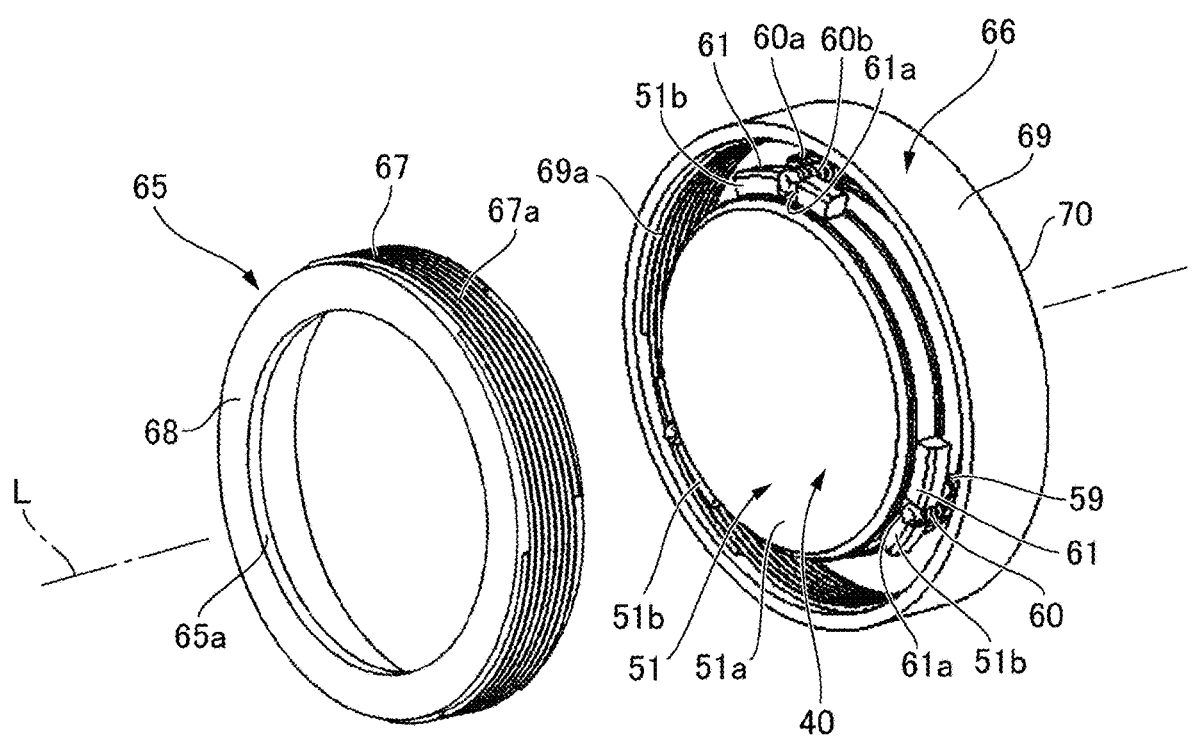
FIG. 7 is an exploded perspective view of the lens unit shown in FIG. 5.
Figure 8:
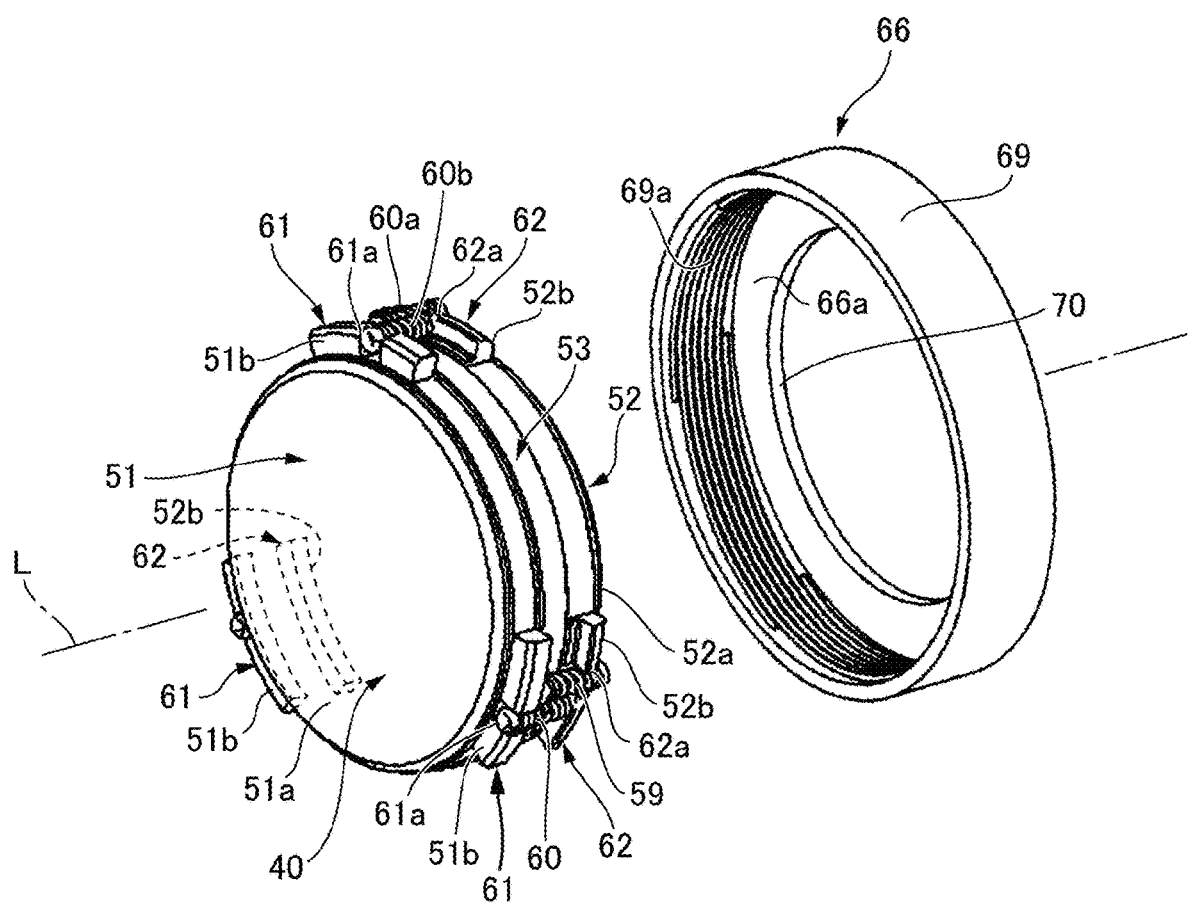
FIG. 8 is an exploded perspective view of the lens unit in the state in which a first member is detached.

FIG. 5 is a perspective view of a lens unit according to Practical Example 2. FIG. 6 is a cross-sectional view of the lens unit shown in FIG. 5 when being cut along the line B-B. FIG. 7 is an exploded perspective view of the lens unit shown in FIG. 5. FIG. 8 is an exploded perspective view of the lens unit in the state in which the first member is detached. The lens unit 50B according to the present example is provided with constituents corresponding to those of the lens unit 50A according to Practical Example 1. Therefore, the description will be presented denoting the corresponding constituents by the same reference numerals.

As shown in FIG. 5, the lens unit 50B according to Practical Example 2 has the jointed lens 40 and the adjustment mechanism 55. As shown in FIG. 6, the jointed lens 40 is provided with the first lens 51, the second lens 52 arranged on the optical axis L of the first lens 51, and the third lens 53 disposed between the first lens 51 and the second lens 52. Further, the jointed lens 40 is provided with the first jointing member 54a and the second jointing member 54b, wherein the first jointing member 54a is located between the first lens 51 and the third lens 53, and adheres to the first lens 51 and the third lens 53, and the second jointing member 54b is located between the third lens 53 and the second lens 52, and adheres to the third lens 53 and the second lens 52. The first jointing member 54a and the second jointing member 54b have a light transmissive property. Further, the first jointing member 54a and the second jointing member 54b are elastically deformable. In the present example, the jointing member 54 is an adhesive.

The adjustment mechanism 55 holds the first lens 51 and the second lens 52 in the state in which the distance in the optical axis L direction between the first lens 51 and the second lens 52 can be adjusted. The adjustment mechanism 55 relatively moves the first lens 51 and the second lens 52 in the optical axis L direction to thereby adjust the distance T between a first-lens lateral surface 51a at an opposite side to the second lens 52 in the first lens 51 and a second-lens lateral surface 52a at an opposite side to the first lens 51 in the second lens 52, and then keeps them in the adjusted state.

The adjustment mechanism 55 is provided with first reference surfaces 51b disposed by the outer circumferential side of an effective ray range of the first-lens lateral surface 51a, and second reference surfaces 52b disposed by the outer circumferential side of an effective ray range of the second-lens lateral surface 52a. Further, the adjustment mechanism 55 is provided with an inter-surface distance adjustment member 63, first spring members 60a for pressing the first lens 51 toward the optical axis L direction, and second spring members 60b for pressing the second lens 52 toward the optical axis L direction.

As shown in FIG. 7, the first reference surfaces 51b are disposed at three places around the optical axis L of the first lens 51. As shown in FIG. 8, the second reference surfaces 52b are disposed at three places around the optical axis L of the second lens 52. In the present example, the three first reference surfaces 51b and the three second reference surfaces 52b are each disposed at regular angular intervals. The first reference surfaces 51b and the second reference surfaces 52b are located at the same angular positions around the optical axis L. More specifically, the first lens 51 is provided with first protruding parts 61 protruding outward in the radial direction at three places at regular angular intervals around the optical axis L. The surface at an opposite side to the second lens 52 of each of the first protruding parts 61 corresponds to the first reference surface 51b perpendicular to the optical axis L. The second lens 52 is provided with second protruding parts 62 protruding outward in the radial direction at three places at regular angular intervals around the optical axis L. When viewed from the optical axis L direction, the first protruding parts 61 and the second protruding parts 62 overlap each other. The surface at an opposite side to the first lens 51 of each of the second protruding parts 62 corresponds to the second reference surface 52b perpendicular to the optical axis L.

Here, the first protruding parts 61 and the first reference surfaces 51b can be formed using a metal mold when molding the first lens 51. It should be noted that the first reference surfaces 51b can be disposed outside the effective ray range of the first lens 51 without providing the first protruding parts 61 to the first lens 51. In this case, the first reference surfaces 51b can be formed by cutting work after molding the first lens 51. Similarly, the second protruding parts 62 and the second reference surfaces 52b can be formed using a metal mold when molding the second lens 52. The second reference surfaces 52b can be disposed outside the effective ray range of the second lens 52 without providing the second protruding parts 62 to the second lens 52. In this case, the second reference surfaces 52b can be formed by cutting work after molding the second lens 52.

As shown in FIG. 7 and FIG. 8, the inter-surface distance adjustment member 63 has a first member 65 and a second member 66. As shown in FIG. 6, the first member 65 is provided with a first ring-like part 67 located at an outer side in the radial direction of the first lens 51 and the second lens 52, and a first ring-like protruding part 68 protruding toward the inner circumference from the first ring-like part 67. The first ring-like protruding part 68 protrudes from an end portion at an opposite side to the second lens 52 of the first ring-like part 67 inward in the radial direction. The first ring-like protruding part 68 is provided with a first contact surface 65a which can make contact with the first reference surface 51b of the first lens 51 from the optical axis L direction. The first ring-like part 67 is provided with an external thread 67a. The second member 66 is provided with a second ring-like part 69 located at an outer side in the radial direction of the first ring-like part 67 coaxially with the first ring-like part 67, and a second ring-like protruding part 70 protruding toward the inner circumference from the second ring-like part 69. The second ring-like protruding part 70 protrudes from an end portion at an opposite side to the first lens 51 of the second ring-like part 69 inward in the radial direction. The second ring-like protruding part 70 is provided with a second contact surface 66a which can make contact with the second reference surface 52b of the second lens 52 from the optical axis L direction. The second ring-like part 69 is provided with an internal thread 69a which screws together with the external thread 67a of the first ring-like part 67. It should be noted that it is possible for the second ring-like part 69 of the second member 66 to be located at the inner side in the radial direction of the first ring-like part 67. In this case, the second ring-like part 69 is provided with an external thread, and the first ring-like part 67 is provided with an internal thread.

The first spring members 60a and the second spring members 60b are each disposed at three places around the optical axis L. The first spring members 60a are each a coil spring. In each of the first spring members 60a, one end in the optical axis L direction makes contact with the first lens 51, and the other end makes contact with the second ring-like protruding part 70. Specifically, the first spring members 60a are each disposed between the second contact surface 66a of the second ring-like protruding part 70 of the second member 66 and the first protruding part 61 of the first lens 51 to press the first lens 51 toward the first contact surface 65a. Thus, the first reference surfaces 51b of the first lens 51 make contact with the first contact surface 65a. The second spring members 60b are each a coil spring. In each of the second spring members 60b, one end in the optical axis L direction makes contact with the first ring-like protruding part 68 of the first member 65, and the other end makes contact with the second lens 52. Specifically, the second spring members 60b are each disposed between the first ring-like protruding part 68 of the first member 65 and the second protruding part 62 of the second lens 52 to press the second lens 52 toward the second contact surface 66a. Thus, the second reference surfaces 52b of the second lens 52 make contact with the second contact surface 66a.

As shown in FIG. 7 or FIG. 8, each of the first protruding parts 61 of the first lens 51 is provided with a first groove 61a for disposing the second spring member 60b between the first ring-like protruding part 68 and the second protruding part 62 of the second lens 52. The first groove 61a penetrates the first protruding part 61 in the optical axis L direction. Further, each of the second protruding parts 62 of the second lens 52 is provided with a second groove 62a for disposing the first spring member 60a between the second ring-like protruding part 70 and the first protruding part 61 of the first lens 51. The second groove 62a penetrates the second protruding part 62 in the optical axis L direction.

Here, when relatively rotating the first member 65 and the second member 66, the first member 65 and the second member 66 relatively move in the optical axis L direction due to the screwing engagement between the external thread 67a and the internal thread 69a. Thus, the distance between the first contact surface 65a of the first member 65 and the second contact surface 66a of the second member 66 varies in the optical axis L direction. Meanwhile, the first lens 51 is kept by the first spring members 60a in the state in which the first reference surfaces 51b have contact with the first contact surface 65a. The second lens 52 is kept by the second spring members 60b in the state in which the second reference surfaces 52b have contact with the second contact surface 66a. Therefore, when the distance between the first contact surface 65a of the first member 65 and the second contact surface 66a of the second member 66 varies in the optical axis L direction, the distance T in the optical axis L direction between the first lens 51 and the second lens 52 changes following the variation.

According to the present example, since the lens unit 50B is provided with the adjustment mechanism 55, it is possible to adjust the distance T between the first-lens lateral surface 51a of the first lens 51 and the second-lens lateral surface 52a of the second lens 52 by relatively moving the first lens 51 and the second lens 52 in the optical axis L direction. Further, due to the adjustment mechanism 55, the distance T between the first-lens lateral surface 51a and the second-lens lateral surface 52a can be kept in the adjusted state.

Here, the first jointing member 54a and the second jointing member 54b are elastically deformable. Therefore, when the distance between the first lens 51 and the second lens 52 changes, the first jointing member 54a changes in the thickness in the optical axis L direction to keep the state of adhering to the first lens 51 and the third lens 53. Further, when the distance between the first lens 51 and the second lens 52 changes, the second jointing member 54b changes in the thickness in the optical axis L direction to keep the state of adhering to the third lens 53 and the second lens 52.

It should be noted that in the lens unit 50B according to the present example, the further in the radial direction from the optical axis L the position where the external thread 67a and the internal thread 69a screw together is, the more accurately the distance T between the first-lens lateral surface 51a of the first lens 51 and the second-lens lateral surface 52a of the second lens 52 can be adjusted. Therefore, when the amount of protrusion outward in the radial direction of the first protruding part 61 of the first lens 51 and the amount of protrusion outward in the radial direction of the second protruding part 62 of the second lens 52 are made larger than in the case shown in FIG. 5 through FIG. 8, and the outside diameter of the first ring-like part 67 of the first member 65 and the inside diameter of the second ring-like part 69 of the second member 66 are set to larger dimensions, it is possible to adjust the distance T between the first-lens lateral surface 51a and the second-lens lateral surface 52a with higher accuracy.

Modified Example of Lens Unit

Figure 9:
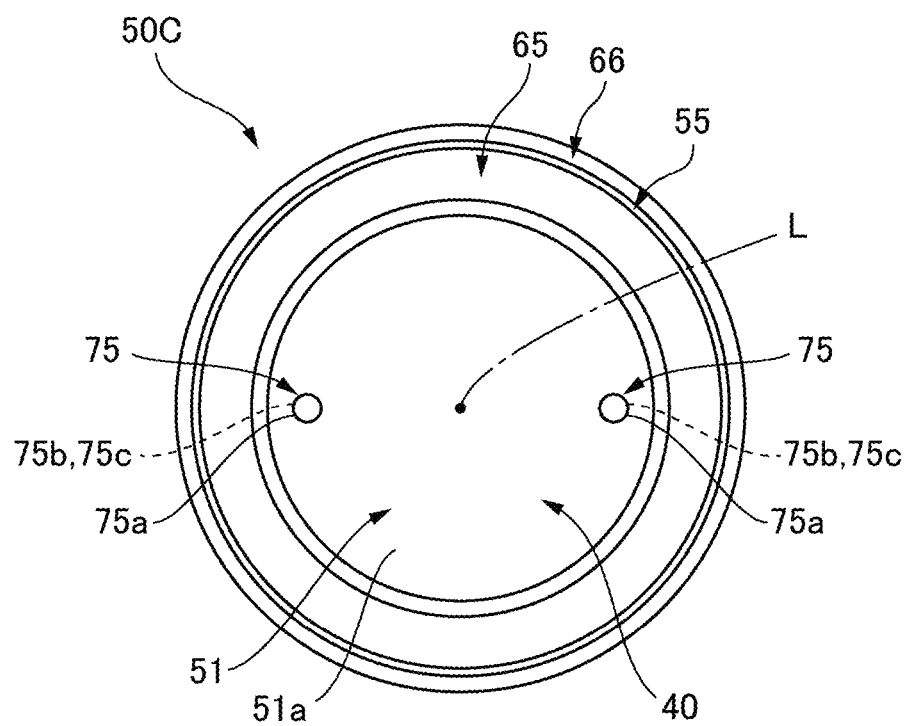
FIG. 9 is an explanatory diagram of a lens unit according to Modified Example 1.

Here, it is possible for the lens units 50A, 50B to have a rotation restrictor 75 for preventing the first lens 51, the second lens 52, and the third lens from relatively rotating around the optical axis L. FIG. 9 is an explanatory diagram of a lens unit according to Modified Example 1 provided with the rotation restrictor 75.

The lens unit 50C according to Modified Example 1 is obtained by providing the lens unit 50B with the rotation restrictor 75. As shown in FIG. 9, as the rotation restrictor 75, the lens unit 50C is provided with first through holes 75a penetrating the first lens 51 in the optical axis L direction outside the effective ray range of the first lens 51, second through holes 75b penetrating the second lens 52 in the optical axis L direction outside the effective ray range of the second lens 52, and third through holes 75c penetrating the third lens in the optical axis L direction outside the effective ray range of the third lens. When viewed from the optical axis L direction, the first through holes 75a, the second through holes 75b, and the third through holes 75c overlap each other, respectively.

When installing the lens unit 50C according to Modified Example 1 in a chassis of optical equipment such as a projector, two pins parallel to each other are disposed at the chassis side in advance. Then, one of the pins is made to penetrate the first through hole 75a, the second through hole 75b, and the third through hole 75c of the rotation restrictor 75 each located at one side of the optical axis L. The other of the pins is made to penetrate the first through hole 75*a*, the second through hole 75*b*, and the third through hole 75*c* of the rotation restrictor 75 each located at the other side of the optical axis L. Thus, the first lens 51, the second lens 52, and the third lens 53 are inhibited from relatively rotating around the optical axis L. Therefore, when relatively rotating the first member 65 and the second member 66, it is possible to prevent the first lens 51, the second lens 52, and the third lens 53 from relatively rotating.

It should be noted that in the lens units 50A, 50B described above, it is possible to assume that the jointed lens 40 has two lenses, namely the first lens 51 and the second lens 52, as the optical members. In this case, the first lens 51 and the second lens 52 are bonded to each other with a jointing member 54 provided with a light transmissive property. The jointing member 54 is elastically deformable, and adheres to the first lens 51 and the second lens 52 located before and after the jointing member 54 in the optical axis L direction. It is possible to use an adhesive as the jointing member 54.

Also in such a manner, when the lens unit is provided with the adjustment mechanism 55, it is possible to define the positions of the first lens 51 and the second lens 52 in the optical axis L direction. Therefore, the distance between the first-lens lateral surface 51*a* at the opposite side to the second lens 52 in the first lens 51 and the second-lens lateral surface 52*a* at the opposite side to the first lens 51 in the second lens 52 can be kept in the preset distance T set in advance.

It should be noted that even when forming the jointed lens 40 from the first lens 51 and the second lens 52, it is possible to provide the rotation restrictor 75 for preventing the first lens 51 and the second lens 52 from relatively rotating around the optical axis L. Similarly to the example shown in FIG. 9, the rotation restrictor 75 can be made to be provided with the first though holes 75*a* which penetrate the first lens 51 in the optical axis L direction outside the effective ray range of the first lens 51, and the second through holes 75*b* which penetrate the second lens 52 in the optical axis L direction outside the effective ray range of the second lens 52.

Figure 10:
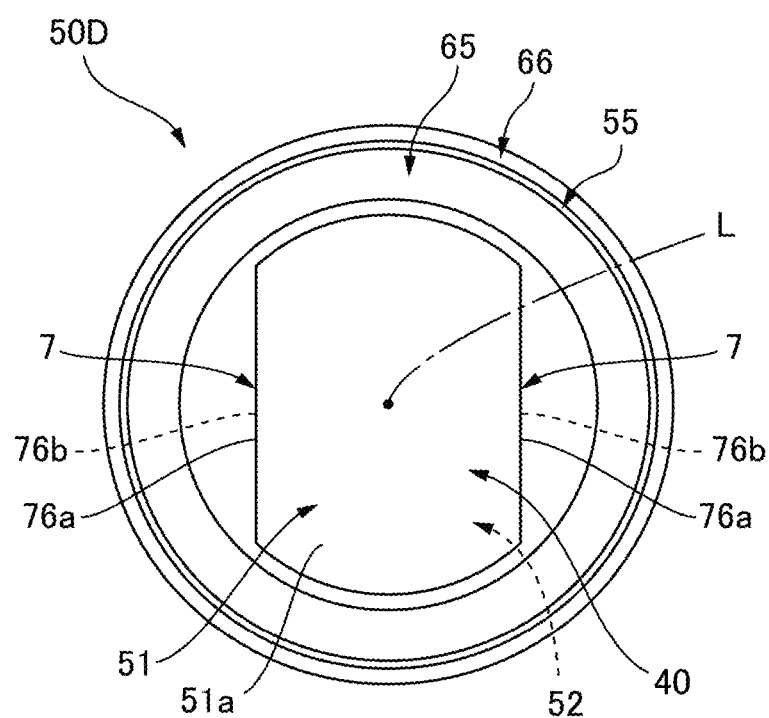
FIG. 10 is an explanatory diagram of a lens unit according to Modified Example 2.

FIG. 10 is an explanatory diagram of a lens unit according to Modified Example 2 provided with another rotation restrictor 76 than that shown in FIG. 9. The lens unit 50D according to Modified Example 2 is obtained by providing the lens unit 50B with the rotation restrictor 76. As shown in FIG. 10, as the rotation restrictor 76, the lens unit 50D according to Modified Example 2 is provided with first step parts 76*a* disposed outside the effective ray range of the first-lens lateral surface 51*a* of the first lens 51, and second step parts 76*b* disposed outside the effective ray range of the second-lens lateral surface 52*a* of the second lens 52. The first step parts 76*a* are disposed at both sides across the optical axis L of the first lens 51. A closer side to the optical axis L of either of the first step parts 76*a* protrudes toward the optical axis L. In other words, the first lens 51 is provided with first cutout parts cut out from the optical axis L direction and the outer circumferential side in the outer circumferential edge portion of the first-lens lateral surface 51*a*. The first cutout parts are disposed at two places across the optical axis L. The second step parts 76*b* are disposed at both sides across the optical axis L. A closer side to the optical axis L of either of the second step parts 76*b* also protrudes toward the optical axis L. In other words, the second lens 52 is provided with second cutout recessed parts cut out from the optical axis L direction and the outer circumferential side in the outer circumferential edge portion of the second-lens lateral surface 52*a*. The second cutout recessed parts are disposed at two places across the optical axis L.

Here, the first step parts 76*a* are each a first rotation stopper with which an external member can make contact from a circumferential direction around the optical axis L. The second step parts 76*b* are each a second rotation stopper with which an external member can make contact from the circumferential direction around the optical axis L. In other words, when installing the lens unit 50D according to Modified Example 2 in the chassis of optical equipment such as a projector, first contact parts which make contact with the first step parts 76*a* from the circumferential direction around the optical axis L and second contact parts which make contact with the second step parts 76*b* from the circumferential direction around the optical axis are disposed in the chassis of a projection optical system 3 or in the chassis of the projector in advance. Thus, it is possible to inhibit the first lens 51 and the second lens 52 from rotating in the optical axis L direction when moving the first lens 51 and the second lens 52 with the adjustment mechanism 55.

Projector

Figure 11:
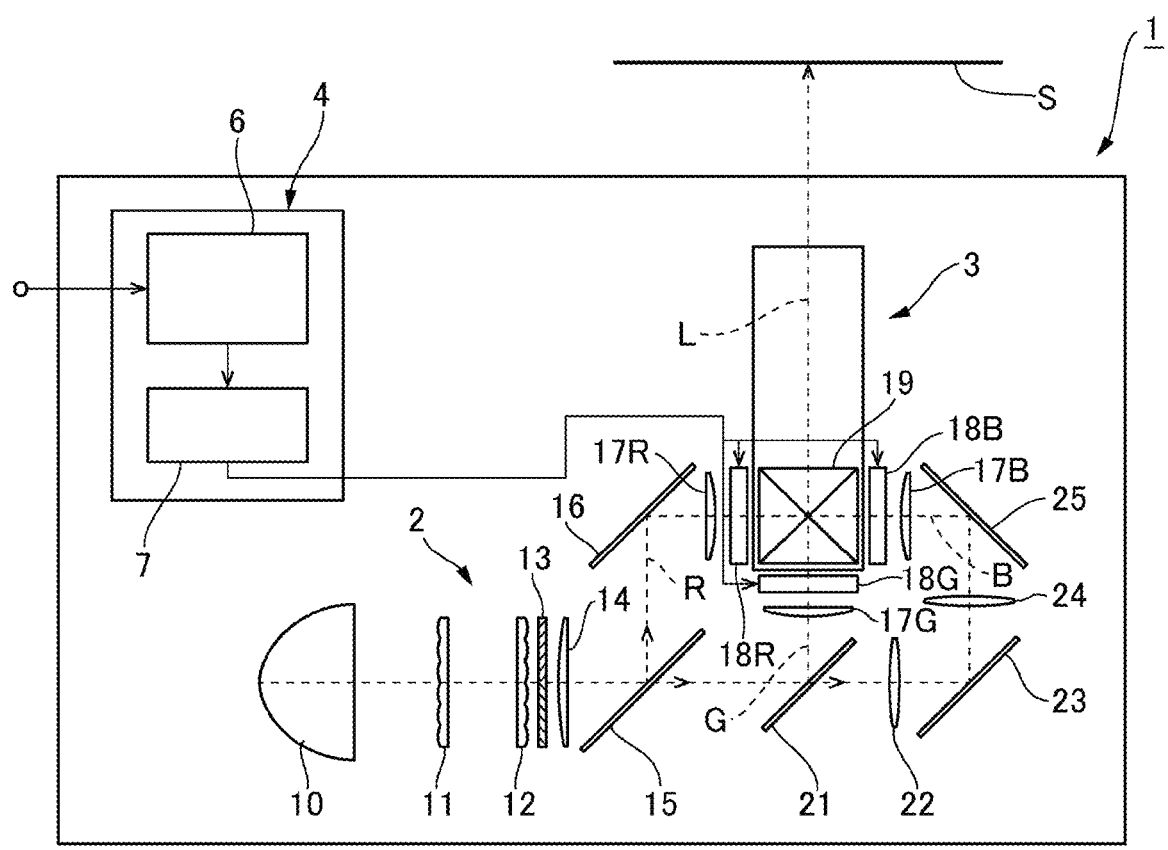
FIG. 11 is a schematic configuration diagram of a projector equipped with a projection optical system.

FIG. 11 is a schematic configuration diagram of a projector equipped with the projection optical system 3 according to the present disclosure. As shown in FIG. 11, the projector 1 is provided with an image formation section 2 for generating a projection image to be projected on a screen S, the projection optical system 3 for enlarging the projection image to project the enlarged image on the screen S, and a control section 4 for controlling an operation of the image formation section 2.

Image Generation Optical System and Control Section

The image formation section 2 is provided with a light source 10, a first integrator lens 11, a second integrator lens 12, a polarization conversion element 13, and a superimposing lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12.

The polarization conversion element 13 converts the light from the second integrator lens 12 into predetermined linearly polarized light. The superimposing lens 14 superimposes the images of the respective lens elements of the first integrator lens 11 on the display area of each of a liquid crystal panel 18R, a liquid crystal panel 18G, and a liquid crystal panel 18B described later via the second integrator lens 12.

Further, the image formation section 2 is provided with a first dichroic mirror 15, a reflecting mirror 16 and a field lens 17R, and the liquid crystal panel 18R. The first dichroic mirror 15 reflects R light as a part of the light beam having entered the first dichroic mirror 15 from the superimposing lens 14, and transmits G light and B light each of which is a part of the light beam having entered the first dichroic mirror 15 from the superimposing lens 14. The R light having been reflected by the first dichroic mirror 15 enters the liquid crystal panel 18R via the reflecting mirror 16 and the field lens 17R. The liquid crystal panel 18R is a light modulator. The liquid crystal panel 18R modulates the R light in accordance with an image signal to thereby form a red projection image.

Further, the image formation section 2 is provided with a second dichroic mirror 21, a field lens 17G, and the liquid crystal panel 18G. The second dichroic mirror 21 reflects the G light as a part of the light beam from the first dichroic mirror 15, and transmits the B light as a part of the light beam from the first dichroic mirror 15. The G light having been reflected by the second dichroic mirror 21 enters the liquid crystal panel 18G via the field lens 17G. The liquid crystal panel 18G is a light modulator. The liquid crystal panel 18G modulates the G light in accordance with the image signal to thereby form a green projection image.

Further, the image formation section 2 is provided with a relay lens 22, a reflecting mirror 23, a relay lens 24, a reflecting mirror 25 and a field lens 17B, and the liquid crystal panel 18B. The B light having been transmitted through the second dichroic mirror 21 enters the liquid crystal panel 18B via the relay lens 22, the reflecting mirror 23, the relay lens 24, the reflecting mirror 25, and the field lens 17B. The liquid crystal panel 18B is a light modulator. The liquid crystal panel 18B modulates the B light in accordance with the image signal to thereby form a blue projection image.

The liquid crystal panel 18R, the liquid crystal panel 18G, and the liquid crystal panel 18B surround a cross dichroic prism 19 from three directions. The cross dichroic prism 19 is a light combining prism, and generates the projection image obtained by combining the light beams modulated by the respective liquid crystal panels 18R, 18G, and 18B with each other.

Here, the cross dichroic prism 19 constitutes apart of the projection optical system 3. The projection optical system 3 projects the projection image (the images formed by the respective liquid crystal panels 18R, 18G, and 18B) combined by the cross dichroic prism 19 on the screen S in an enlarged manner. The screen S is an enlargement-side imaging plane of the projection optical system 3.

The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signals output from the image processing section 6.

The image processing section 6 converts the image signal input from external equipment into image signals including the tones and so on of the respective colors. The display drive section 7 operates the liquid crystal panel 18R, the liquid crystal panel 18G, and the liquid crystal panel 18B based on the projection image signals of the respective colors output from the image processing section 6. Thus, the image processing section 6 displays the projection images corresponding to the image signals on the liquid crystal panel 18R, the liquid crystal panel 18G, and the liquid crystal panel 18B, respectively.

Projection Optical System

Then, the projection optical system 3 will be described. Practical Example 3 through Practical Example 5 will hereinafter be described as configuration examples of the projection optical system 3 to be implemented in the projector 1. It should be noted that in each of Practical Example 3 through Practical Example 5, the liquid crystal panel 18R, the liquid crystal panel 18G, and the liquid crystal panel 18B are described as the liquid crystal panel 18 in the ray chart of the projection optical system. Further, each of Practical Example 3 through Practical Example 5 is provided with the lens unit 50. The lens unit 50 is what is obtained by jointing the two or three lenses to each other with the jointing member 54 elastically deformable. In the lens unit 50, the jointing member 54 is an adhesive. Further, the lens unit 50 is provided with any one of the adjustment mechanisms 55 described in the lens units 50A through 50C described above.

Projection Optical System According to Practical Example 3

Figure 12:
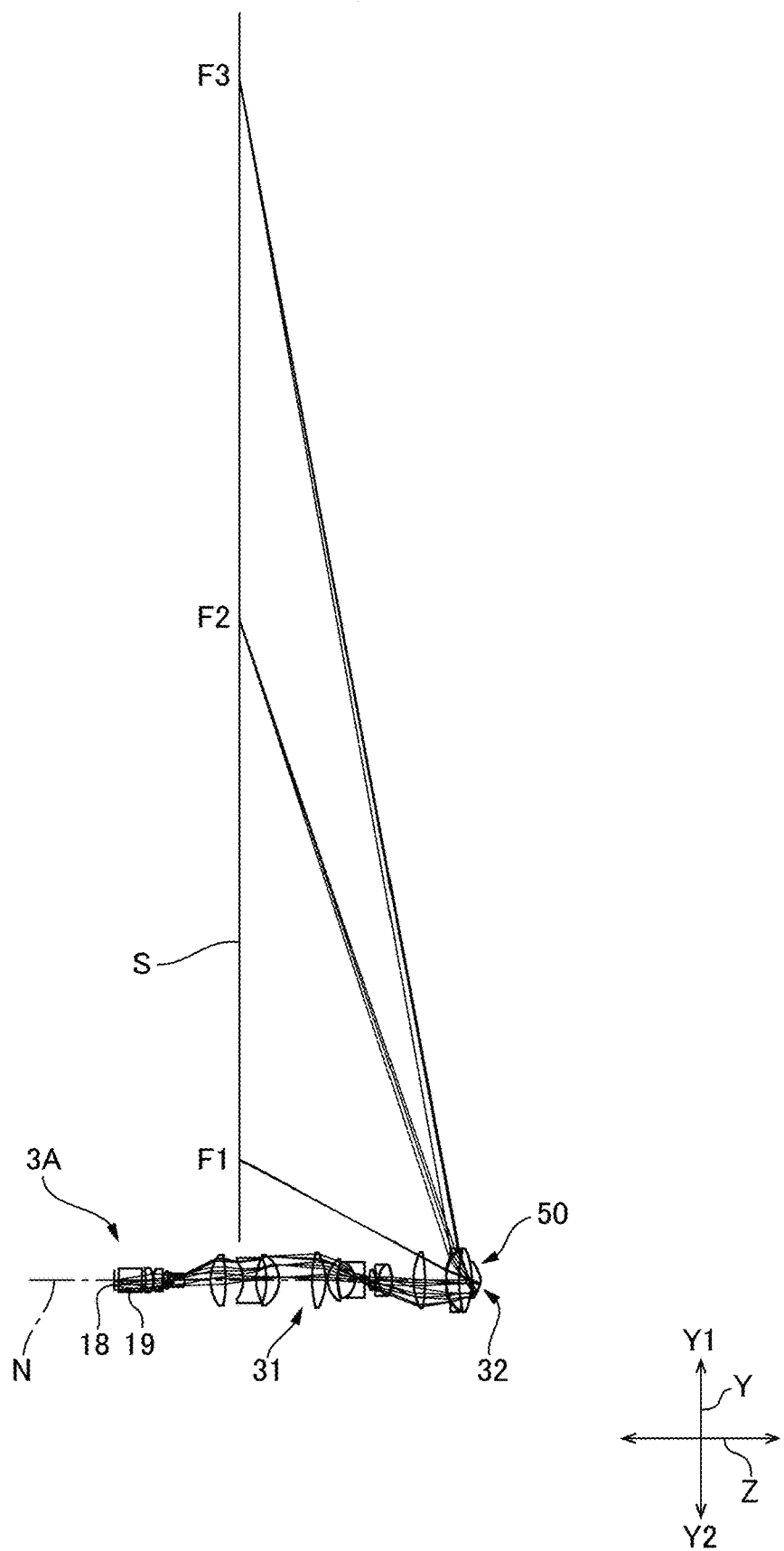
FIG. 12 is a ray chart schematically showing a whole of a projection optical system according to Practical Example 3.
Figure 13:
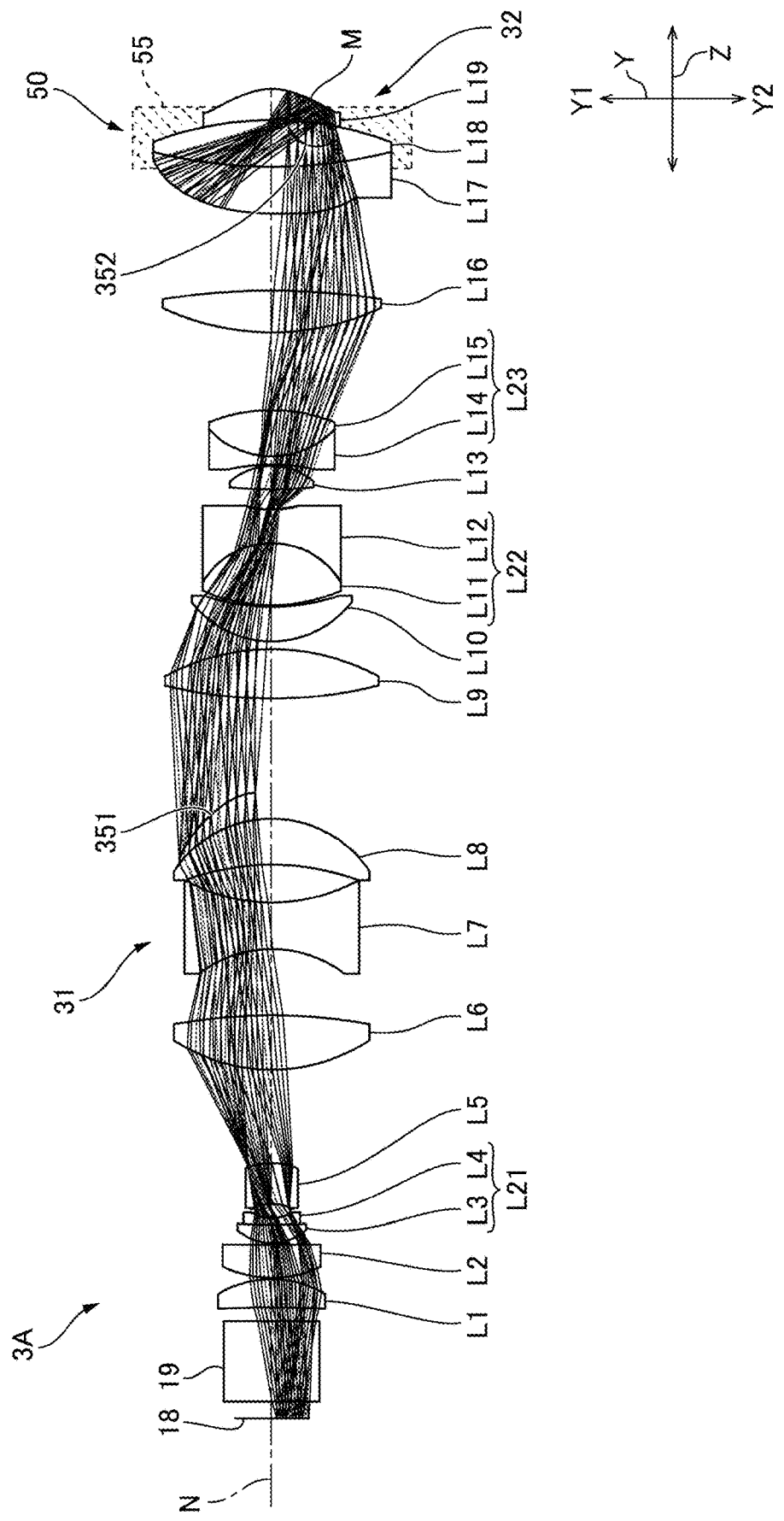
FIG. 13 is a ray chart of the projection optical system according to Practical Example 3.
Figure 14:
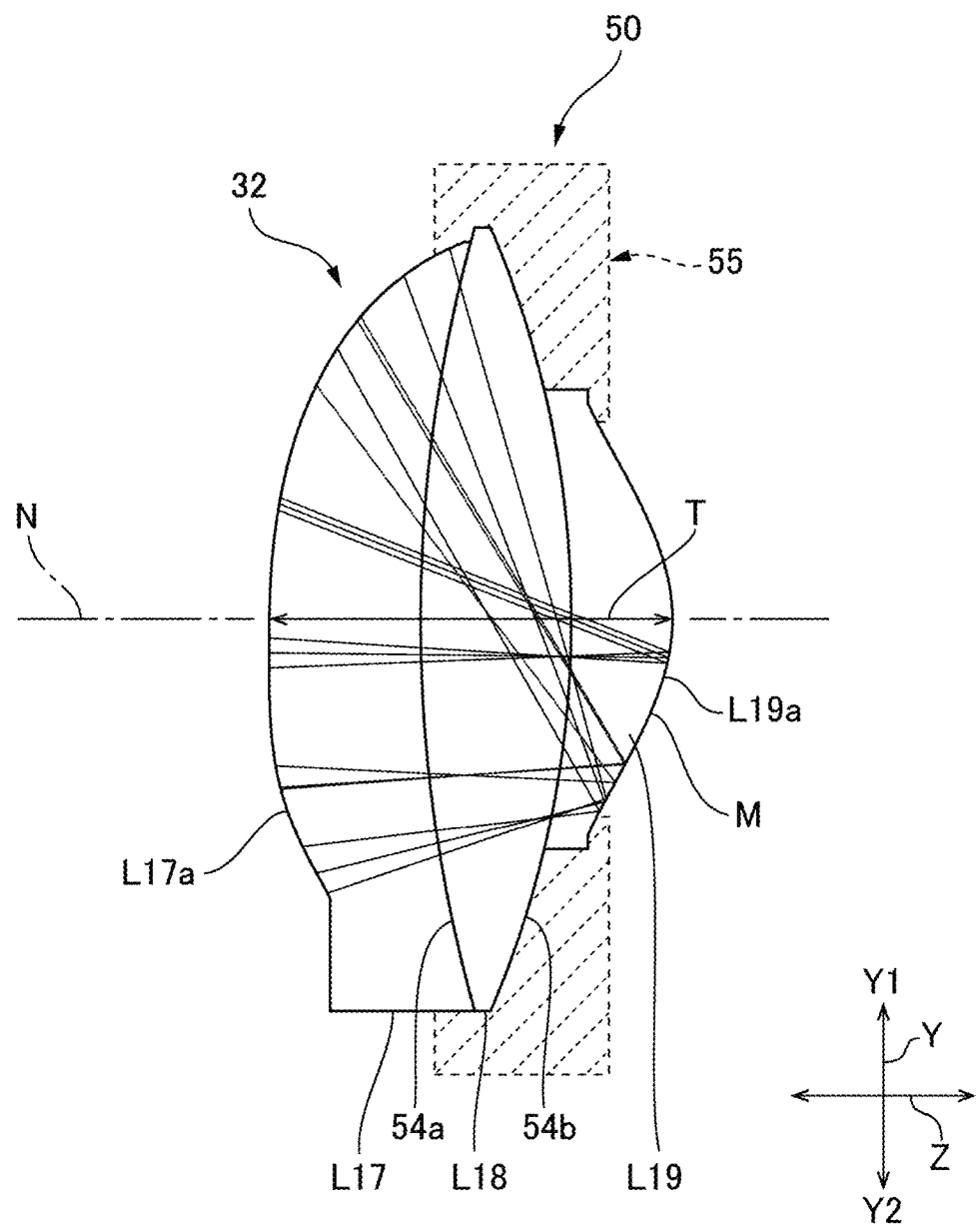
FIG. 14 is a ray chart of a second optical system in Practical Example 3.

FIG. 12 is a ray chart schematically showing a whole of a projection optical system according to Practical Example 3. FIG. 12 schematically shows the light beams which reach the screen S from the projection optical system 3A according to the present example with the light beams F1 through F3. The light beam F1 is a light beam which reaches the position where the image height is the lowest. The light beam F3 is a light beam which reaches the position where the image height is the highest. The light beam F2 is a light beam which reaches a position between the positions of the light beam F1 and the light beam F3. FIG. 13 is a ray chart of the projection optical system 3A according to Practical Example 3. FIG. 14 is a ray chart of a second optical system.

As shown in FIG. 13, the projection optical system 3A according to the present example is constituted by a first optical system 31 and a second optical system 32 arranged in sequence from the reduction-side toward the enlargement-side. The first optical system 31 is a refracting optical system provided with a plurality of lenses. The second optical system 32 is the lens unit 50 having three lenses bonded to each other. The second optical system 32 has a mirror M provided with a concavely curved surface. The projection optical system 3A forms a first intermediate image 351 conjugate with a reduction-side imaging plane in the middle of the first optical system 31. Further, the projection optical system 3A forms a second intermediate image 352 conjugate with the reduction-side imaging plane in the middle of the second optical system 32. Further, the projection optical system 3A forms a final image conjugate with the second intermediate image 352 on the enlargement-side imaging plane.

By the reduction-side imaging plane, there is disposed the liquid crystal panel 18 of the image formation section 2. The liquid crystal panel 18 forms the projection image at the other side of the optical axis N of the first optical system 31. The first intermediate image 351 is formed at one side of the optical axis N of the first optical system 31. The second intermediate image 352 is formed at the other side of the optical axis N of the first optical system 31. The enlargement-side imaging plane is disposed at one side of the optical axis N of the first optical system 31. In the enlargement-side imaging plane, there is disposed the screen S.

In the following description, three axes perpendicular to each other are defined as an X axis, a Y axis, and a Z axis for the sake of convenience. Further, it is assumed that the optical axis direction along the optical axis N of the first optical system 31 is the Z-axis direction, one side of the optical axis N is an upper side Y1 in the Y-axis direction, and the other side is a lower side Y2 in the Y-axis direction. It is assumed that a plane which is perpendicular to the X axis and includes the Y axis and the Z axis is a Y-Z plane. Therefore, the liquid crystal panel 18 forms the projection image in the lower side Y2 of the optical axis N. The first intermediate image 351 is formed in the upper side Y1 of the optical axis N. The second intermediate image 352 is formed in the lower side Y2 of the optical axis N. The screen S is located in the upper side Y1 of the optical axis N. The lateral direction of the screen S corresponds to the X-axis direction. The second intermediate image 352 is an image vertically flipped in the Y-axis direction with respect to the enlarged image to be formed in the screen S. FIG. 12, FIG. 13, and FIG. 14 are each a ray chart in the Y-Z plane.

As shown in FIG. 13, the first optical system 31 has the cross dichroic prism 19, and sixteen lenses L1 through L16. The first lens L1 through the 16-th lens L16 are arranged in this order from the reduction side toward the enlargement side. In the present example, the third lens L3 and the 4-th lens L4 are bonded to each other to form a first jointed lens L21. The 11-th lens L11 and the 12-th lens L12 are bonded to each other to form a second jointed lens L22. The 14-th lens L14 and the 15-th lens L15 are bonded to each other to form a third jointed lens L23.

As shown in FIG. 14, the second optical system 32 is constituted by a 17-th lens L17, an 18-th lens L18, and a 19-th lens L19. The first jointing member 54a intervenes between the 17-th lens and the 18-th lens, and the second jointing member 54b intervenes between the 18-th lens and the 19-th lens. By an outer side in the redial direction of the 17-th lens L17, the 18-th lens L18, and the 19-th lens L19, there is disposed the adjustment mechanism 55 for adjusting and then keeping the distance T between a 17-th-lens lateral surface L17a at an opposite side to the 19-th lens L19 in the 17-th lens L17 and a 19-th-lens lateral surface L19a at an opposite side to the 17-th lens L17 in the 19-th lens L19. Further, the second optical system 32 has the mirror M provided with the concavely curved surface. The mirror M is a reflective coating layer provided to the 19-th-lens lateral surface L19a. The mirror M reflects the ray from the first optical system 31 toward the upper side Y1.

Lens Data

The lens data of the projection optical system 3A is as follows. The surface numbers are provided in sequence from the reduction side toward the enlargement side. The reference symbols are the reference symbols of the lenses and the mirrors. The data of the surface numbers not corresponding to any lenses or any mirrors are dummy data. The reference symbol R represents a curvature radius. The reference symbol D represents an axial surface distance. The reference symbol A represents an effective diameter. The units of R, D, and A are millimeter.

| REFERENCE SYMBOL | SURFACE NUMBER | SHAPE | R | D | GLASS MATERIAL | REFRACTION/ REFLECTION | A |
|---|---|---|---|---|---|---|---|
|  | 0 | SPHERE | INFINITE | 5.3900 |  | REFRACTION | 0.0000 |
|  | 1 | SPHERE | INFINITE | 25.9100 | BSC7 | REFRACTION | 11.9263 |
| 19 | 2 | SPHERE | INFINITE | 4.0000 |  | REFRACTION | 13.9142 |
|  | 3 | SPHERE | INFINITE | 0.3397 |  | REFRACTION | 14.8696 |
| L1 | 4 | SPHERE | −328.1403 | 8.9875 | TAFD5F | REFRACTION | 14.8702 |
|  | 5 | SPHERE | −32.9236 | 0.5000 |  | REFRACTION | 15.6675 |
| L2 | 6 | SPHERE | 35.2778 | 10.6178 | TAF1 | REFRACTION | 14.2863 |
|  | 7 | SPHERE | 2158.7790 | 0.5956 |  | REFRACTION | 12.0454 |
| L3 | 8 | SPHERE | 16.4198 | 5.7747 | FCD515 | REFRACTION | 9.8503 |
| L4 | 9 | SPHERE | 158.3827 | 1.9851 | FD225 | REFRACTION | 8.1367 |
|  | 10 | SPHERE | 12.3305 | 2.8995 |  | REFRACTION | 6.2473 |
|  | 11 | SPHERE | INFINITE | 1.6564 |  | REFRACTION | 5.6369 |
| L5 | 12 | SPHERE | −14.2698 | 13.1316 | SFSL5 | REFRACTION | 5.6271 |
|  | 13 | SPHERE | −20.3638 | 30.0346 |  | REFRACTION | 7.5000 |
| L6 | 14 | SPHERE | 54.1315 | 17.4918 | SLAH89 | REFRACTION | 29.0000 |
|  | 15 | SPHERE | −167.1383 | 21.0941 |  | REFRACTION | 26.1025 |
| L7 | 16 | SPHERE | −37.2827 | 15.0000 | EC3 | REFRACTION | 22.4382 |
|  | 17 | SPHERE | 54.5260 | 12.1913 |  | REFRACTION | 25.8190 |
| L8 | 18 | SPHERE | −76.5126 | 14.7917 | TAFD33 | REFRACTION | 26.4354 |
|  | 19 | SPHERE | −36.2470 | 38.4506 |  | REFRACTION | 29.0033 |
|  | 20 | SPHERE | INFINITE | 0.0000 |  | REFRACTION | 31.6561 |
| L9 | 21 | SPHERE | 133.8789 | 15.8392 | SFSL5 | REFRACTION | 31.8487 |
|  | 22 | SPHERE | −68.9741 | 2.5994 |  | REFRACTION | 31.6470 |
| L10 | 23 | SPHERE | 31.3378 | 11.0553 | TAF1 | REFRACTION | 23.6500 |
|  | 24 | SPHERE | 64.5697 | 0.5000 |  | REFRACTION | 21.2712 |
| L11 | 25 | SPHERE | 52.2125 | 20.0000 | FCD100 | REFRACTION | 20.3631 |
| L12 | 26 | SPHERE | −25.0000 | 10.7786 | TAFD32 | REFRACTION | 11.6726 |
|  | 27 | SPHERE | 32.9539 | 6.4395 |  | REFRACTION | 7.8949 |
| L13 | 28 | SPHERE | 143.1217 | 7.4044 | FCD515 | REFRACTION | 10.7085 |
|  | 29 | SPHERE | −20.0723 | 0.5000 |  | REFRACTION | 12.1527 |
| L14 | 30 | SPHERE | −58.8944 | 2.6061 | FDS90SG | REFRACTION | 13.2638 |
| L15 | 31 | SPHERE | 26.6089 | 14.8509 | SLAH97 | REFRACTION | 16.1290 |
|  | 32 | SPHERE | −52.1867 | 25.0657 |  | REFRACTION | 18.4714 |
| L16 | 33 | SPHERE | 78.7767 | 13.4658 | SNBH57 | REFRACTION | 32.5354 |
|  | 34 | SPHERE | −208.7929 | 5.0000 |  | REFRACTION | 32.4274 |
|  | 35 | SPHERE | INFINITE | 19.5666 |  | REFRACTION | 30.9799 |
| L17 | 36 | ASPHERIC SURFACE | −369.8594 | 15.0386 | E48R_ZEON | REFRACTION | 26.5882 |
| L18 | 37 | SPHERE | 150.0000 | 15.0000 | SBAL12 | REFRACTION | 23.1486 |
|  | 38 | SPHERE | −103.0000 | 10.0779 | E48R_ZEON | REFRACTION | 20.1205 |
| L19, M | 39 | ASPHERIC SURFACE | −18.5869 | −10.0779 | E48R_ZEON | REFLECTION | 20.2000 |
| L18 | 40 | SPHERE | −103.0000 | −15.0000 | SBAL12 | REFRACTION | 14.3544 |
|  | 41 | SPHERE | 150.0000 | −15.0386 | E48R_ZEON | REFRACTION | 32.9333 |
| L17 | 42 | ASPHERIC SURFACE | 74.397 | −240.9501 |  | REFRACTION | 37.4796 |
|  | 43 | SPHERE | INFINITE | 0.0000 |  | REFRACTION | 1450.6157 |

The aspherical coefficient of each of the aspheric surfaces is as follows.

| SURFACE NUMBER | 36 | 39 | 42 |
|---|---|---|---|
| Y CURVATURE RADIUS | −369.8593556 | −18.58690118 | 74.39788526 |
| CONIC CONSTANT (K) | 0 | −4.147826268 | 2.563567409 |
| 4-th-ORDER COEFFICIENT (A) | 2.37906E−05 | −1.85425E−05 | 1.00621E−06 |
| 6-th-ORDER COEFFICIENT (B) | −2.90682E−08 | 5.74483E−08 | 7.74934E−10 |
| 8-th-ORDER COEFFICIENT (C) | 2.72699E−11 | −7.17873E−11 | −7.32277E−13 |
| 10-th-ORDER COEFFICIENT (D) | −1.36402E−14 | 4.39201E−14 | 2.98841E−16 |

15

Figure 15:
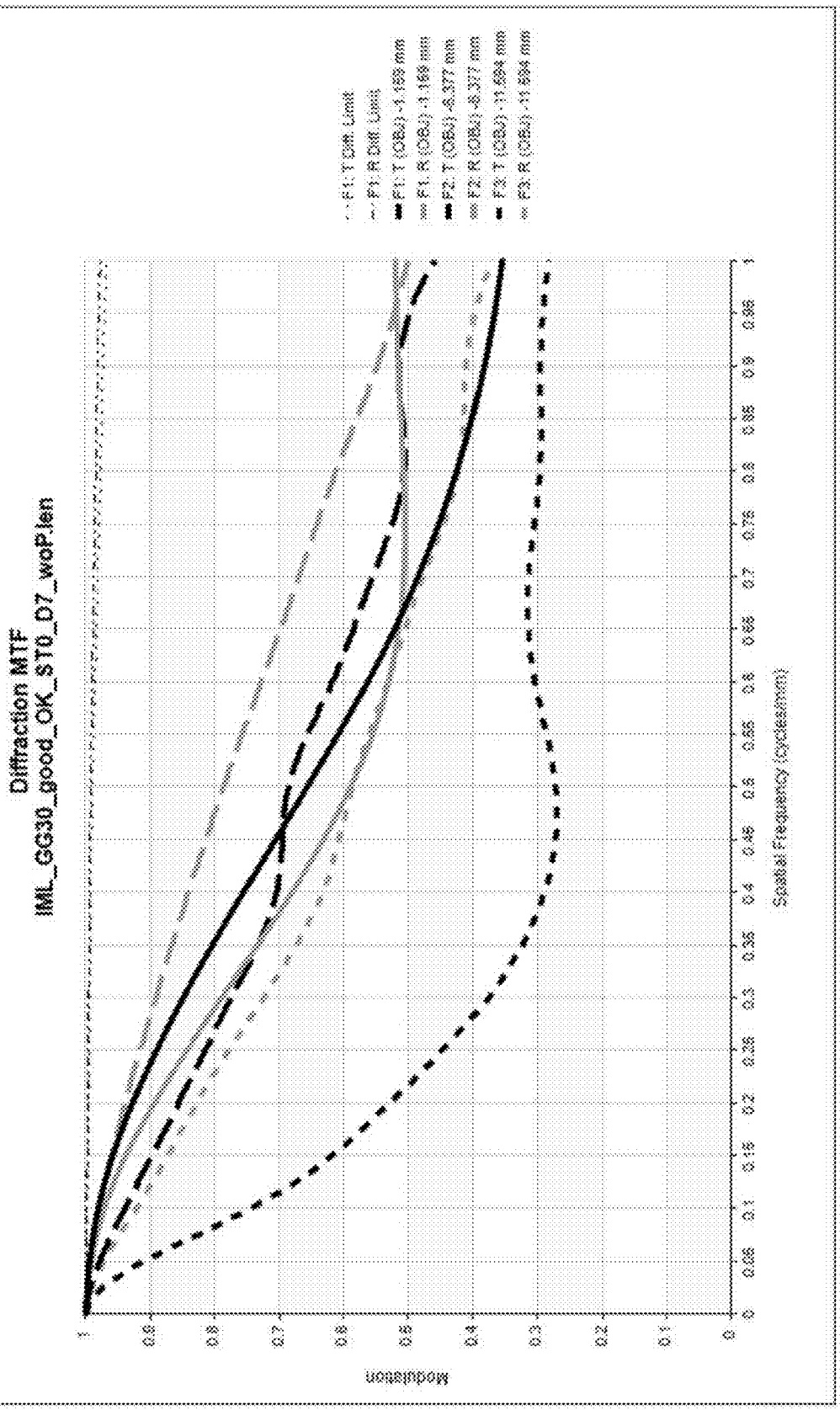
FIG. 15 is a diagram showing MTF by the enlargement-side of the projection optical system according to Practical Example 3.
Figure 16:
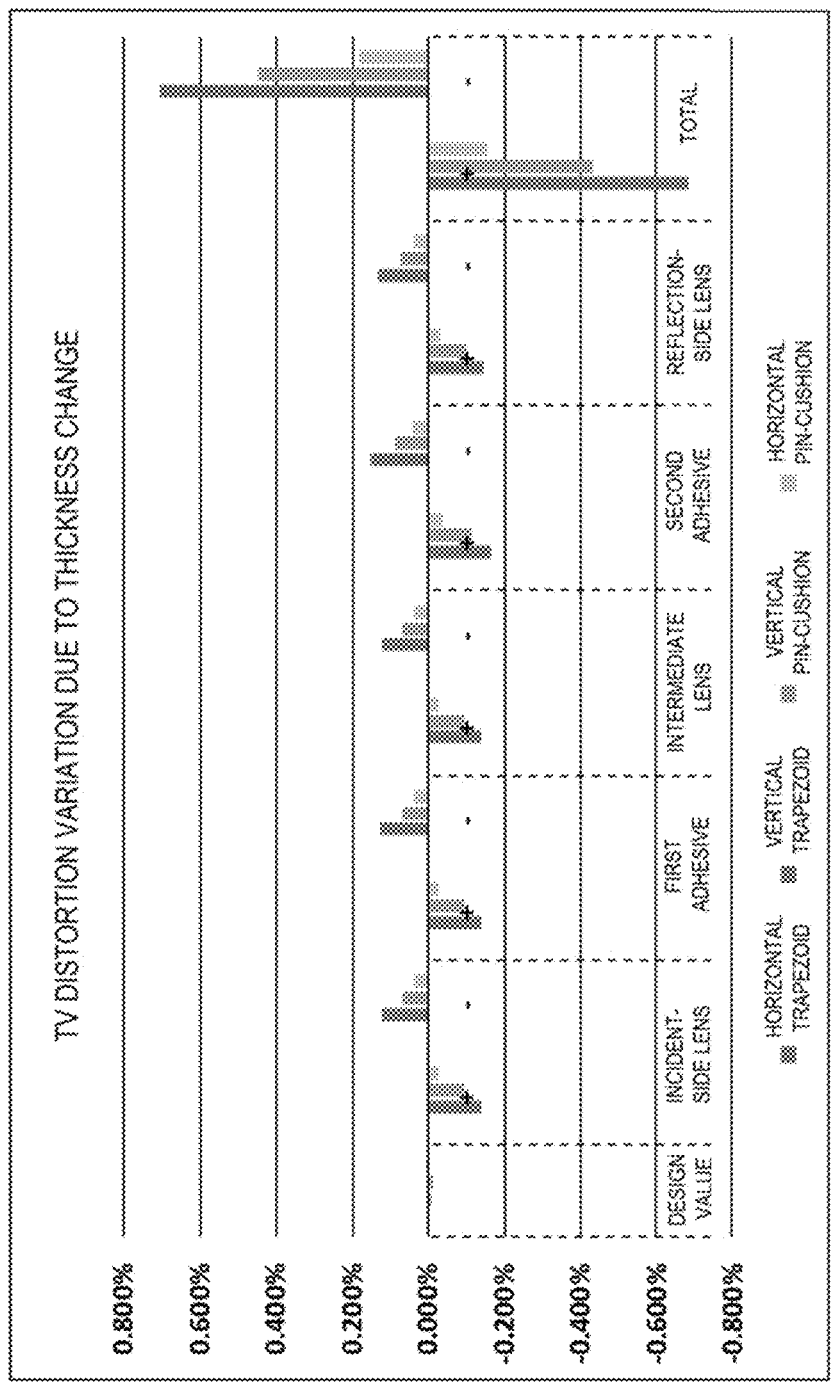
FIG. 16 is a graph of a relationship between the thickness of the lens unit and a TV distortion of a final image.

FIG. 15 is a diagram showing MTF by the enlargement side of the projection optical system 3A. The horizontal axis in FIG. 15 showing the MTF represents a spatial frequency. The vertical axis represents a contrast reproduction ratio. In the drawing, the black graph represents a tangential ray (T), and the gray graph represents a radial ray (R). Further, in each of the tangential ray (T) and the radial ray (R), the solid line represents the light beam F1, the dashed line represents the light beam F2, and the dotted line represents the light beam F3. As shown in FIG. 16, the projection optical system 3A according to the present example is high in resolution.

Functions and Advantages

Here, the lens unit 50 constituting the second optical system 22 is provided with the refracting surface and the reflecting surface, and the ray is folded at these surfaces. Therefore, when the thickness of the lens unit 50 changes from the design value, there is a problem that the direction of the ray passing through the lens unit 50 varies to increase the TV distortion in the final image.

FIG. 16 is a graph showing a simulation of a relationship between the change in thickness of each of the members constituting the lens unit and the TV distortion in the final image to be projected to the screen S in the projection optical system constituted by the first optical system formed of the refracting optical system and the second optical system formed of the lens unit. The lens unit targeted by the simulation is one corresponding to the lens unit 50. Specifically, the lens unit is constituted by an incident-side lens which the ray from the first optical system enters, a reflection-side lens provided with a mirror formed of a coating layer, and an intermediate lens located between the incident-side lens and the reflection-side lens. In terms of the projection optical system 3A according to the present example, the incident-side lens corresponds to the 17-th lens L17. The reflection-side lens corresponds to the 19-th lens L19. The intermediate lens corresponds to the 18-th lens L18. Between the incident-side lens and the intermediate lens, there intervenes the first jointing member 54a adhering to these lenses. Between the intermediate lens and the reflection-side lens, there intervenes the second jointing member 54b adhering to these lenses.

In FIG. 16, the values in the vertical axis in the fields of the incident-side lens, the first adhesive, the intermediate lens, the second adhesive, and the reflection-side lens each represent the variation of the TV distortion when the thickness increases or decreases as much as 30 μm from the design value. These values represent when the thickness of one of the members changes alone, and the thicknesses of the other of the members are kept in the design values. Further, the value in the vertical axis in the field of the total represents the variation of the TV distortion when all of the incident-side lens, the first adhesive, the intermediate lens, the second adhesive, and the reflection-side lens each increase as much as 30 μm, or each decrease as much as 30 μm. It should be noted that when the vertical trapezoid of the TV distortion positively varies means the state in which an upper side of the screen becomes longer than the lower side, and when the vertical trapezoid thereof negatively varies means the reverse. When the vertical pin-cushion of the TV distortion positively varies means the state in which the height at right and left sides becomes larger than the height at the center of the screen, and when the vertical pin-cushion thereof negatively varies means the reverse. When the horizontal pin-cushion of the TV distortion positively varies means the state in which the width at right and left sides becomes larger than the width at the center of the screen, and when the horizontal pin-cushion thereof negatively varies means the reverse.

Figure 17:
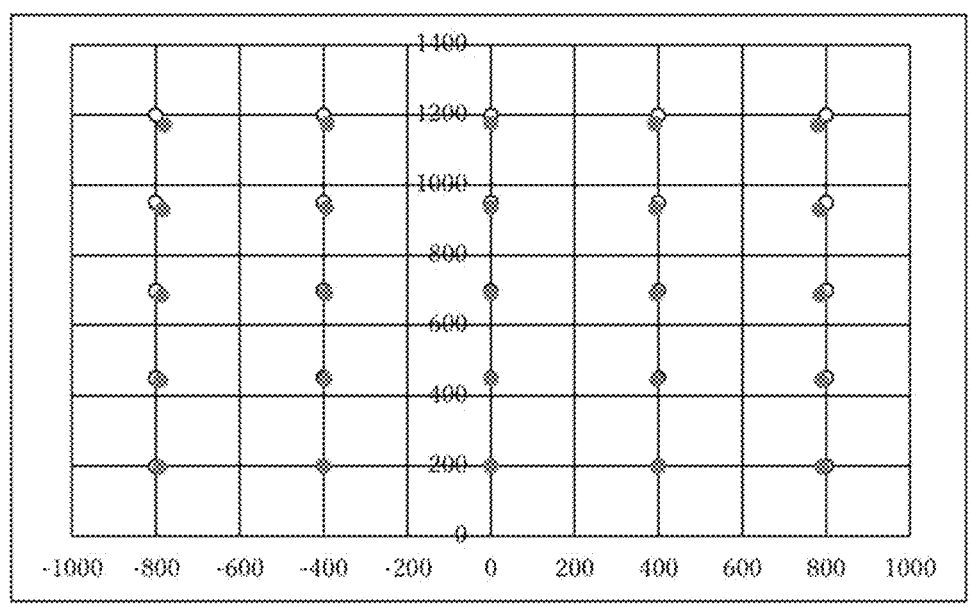
FIG. 17 is an explanatory diagram of a distortion aberration of the final image due to the thickness of the lens unit.
Figure 18:
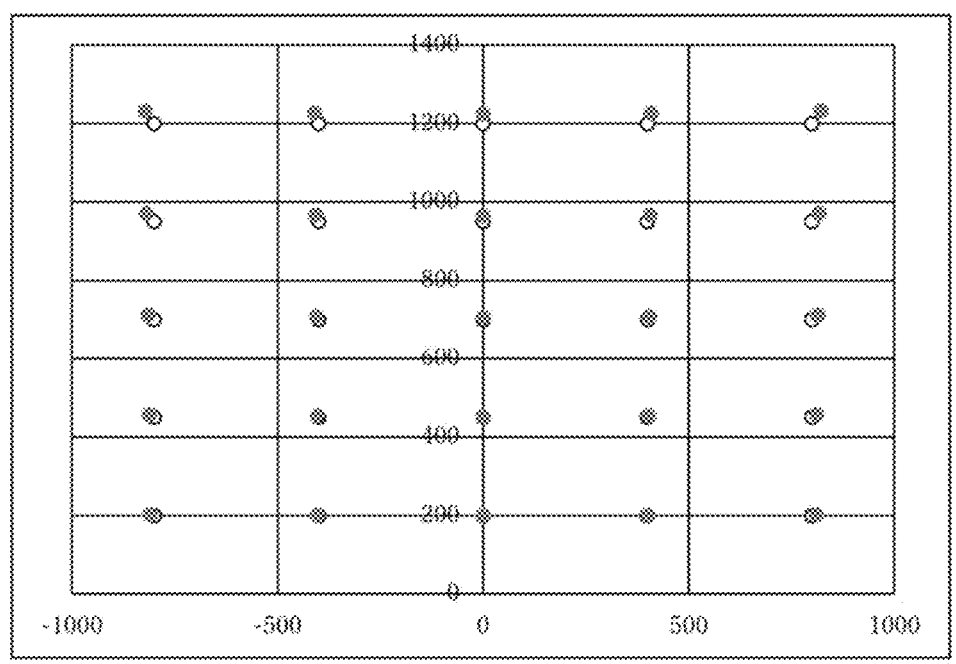
FIG. 18 is an explanatory diagram of a distortion aberration of the final image due to the thickness of the lens unit.

FIG. 17 is an explanatory diagram of the variation of the vertical trapezoid when the thickness of the lens unit takes the design value, and when all of the members of the incident-side lens, the first adhesive, the intermediate lens, the second adhesive, and the reflection-side lens each become thicker as much as 30 μm with respect to the points set at twenty places in the final image to be shown in the screen S. FIG. 18 is an explanatory diagram of the variation of the vertical trapezoid when the thickness of the lens unit takes the design value, and when all of the members of the incident-side lens, the first adhesive, the intermediate lens, the second adhesive, and the reflection-side lens each become thinner as much as 30 μm with respect to the points in the final image to be shown in the screen S. In FIG. 17 and FIG. 18, the white circles represent the positions of the points when the thickness of the lens unit takes the design value, and the gray circles represent the positions of the points when the thickness of the lens unit increases or decreases from the design value.

According to FIG. 16, it is understood that the TV distortion varies when the thickness of each of the incident-side lens, the first adhesive, the intermediate lens, the second adhesive, and the reflection-side lens increases or decreases. Further, it is also understood that when all of the thicknesses of the incident-side lens, the first adhesive, the intermediate lens, the second adhesive, and the reflection-side lens increase or decrease, the TV distortion significantly varies compared to the value of the TV distortion at the design value. Also in FIG. 17 and FIG. 18, it is understood that the TV distortion significantly varies compared to the value of the TV distortion at the design value when all of the thicknesses of the incident-side lens, the first adhesive, the intermediate lens, the second adhesive, and the reflection-side lens increase or decrease.

In contrast, from FIG. 16, it is understood that the TV distortion varies at a constant rate when the thickness of any one of the incident-side lens, the first adhesive, the intermediate lens, the second adhesive, and the reflection-side lens increases or decreases irrespective of what member increases or decreases in thickness. Therefore, it can be determined that the TV distortion can be suppressed by approximating the distance between the plane of incidence of the incident-side lens and the reflecting surface of the reflection-side lens as the total thickness of the jointed lens to the design value even when changing the thicknesses of the two members, namely the first adhesive and the second adhesive, which deform elastically.

From such a point of view, in the projection optical system 3A according to the present example, the second optical system 32 is formed of the lens unit 50 provided with the adjustment mechanism 55. Therefore, in the second optical system 32, it is possible to adjust the distance T between the 17-th-lens lateral surface L17a of the 17-th lens L17 and the 19-th-lens lateral surface L19a of the 19-th lens L19 to approximate to the design value. Further, it is possible to achieve this adjustment while visually checking the final image projected to the screen S. Therefore, it is possible to prevent the TV distortion from occurring in the final image, and thus, it is possible to prevent the distortion aberration from occurring in the final image.

Further, in the present example, it is also possible to suppress the distortion aberration occurring in the first optical system 31 by adjusting the distance T between the 17-th-lens lateral surface L17a of the 17-th lens L17 and the 19-th-lens lateral surface L19a of the 19-th lens L19 in the second optical system 32.

Projection Optical System According to Practical Example 4

Figure 19:
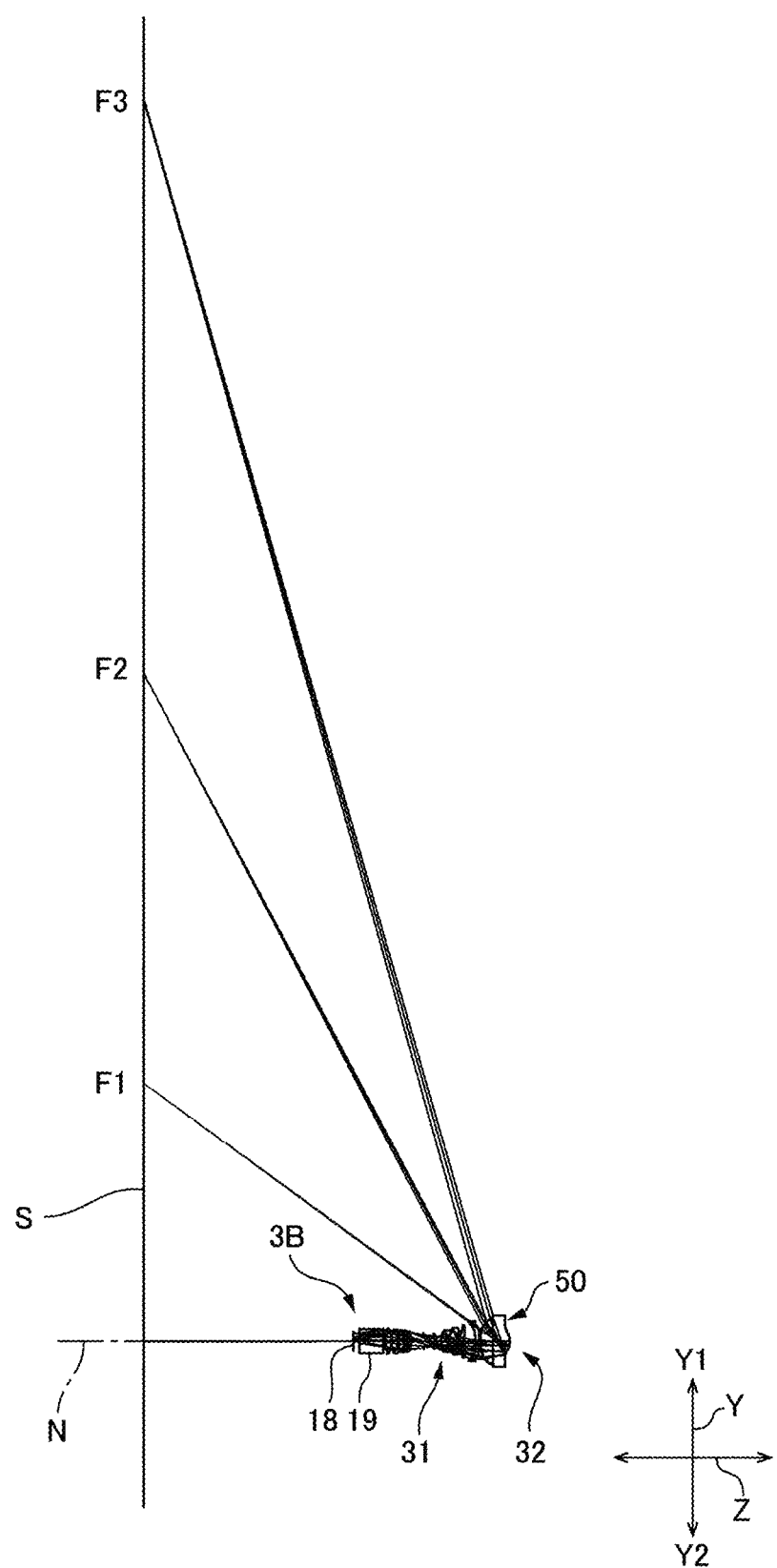
FIG. 19 is a ray chart schematically showing a whole of a projection optical system according to Practical Example 4.
Figure 20:
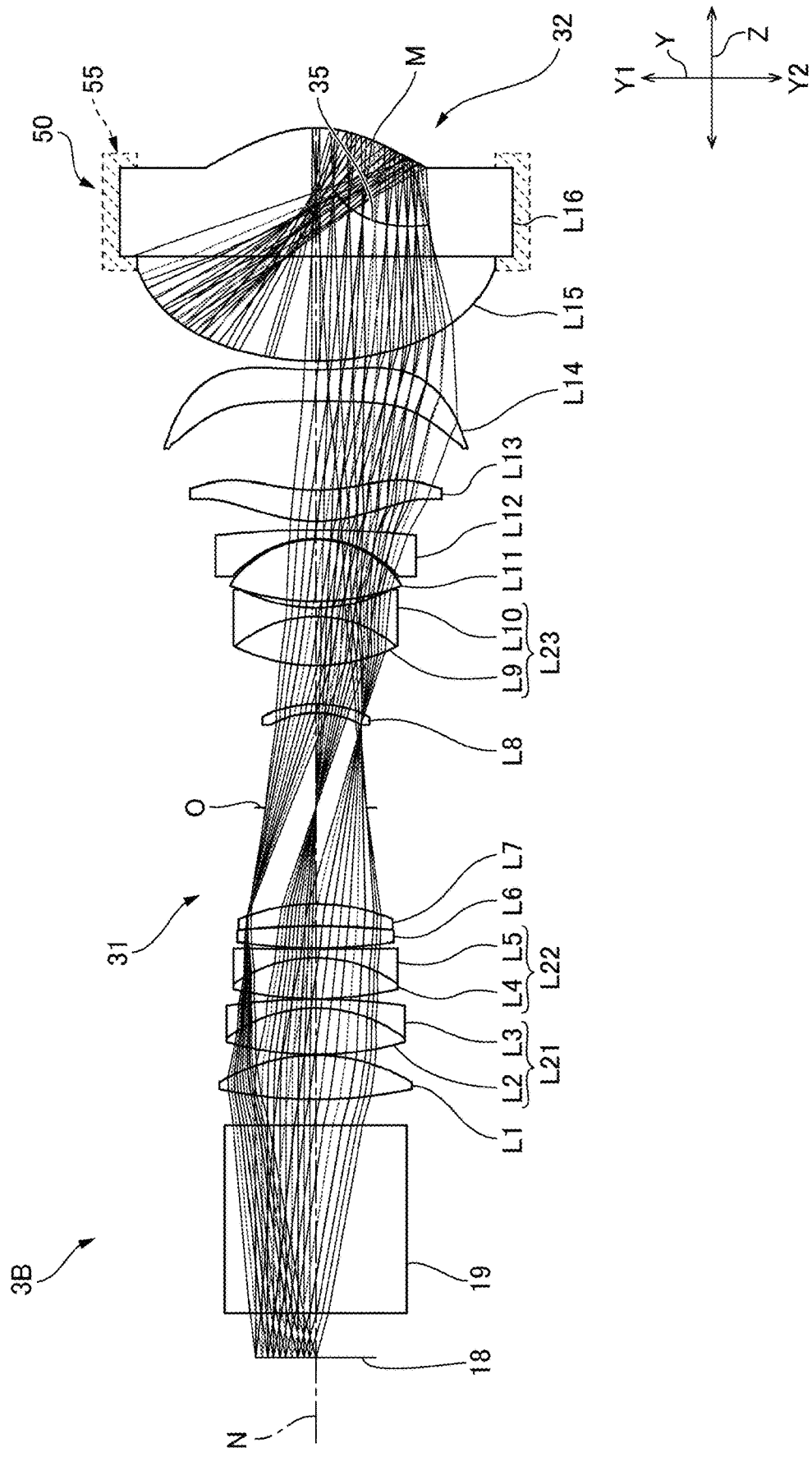
FIG. 20 is a ray chart of the projection optical system according to Practical Example 4.
Figure 21:
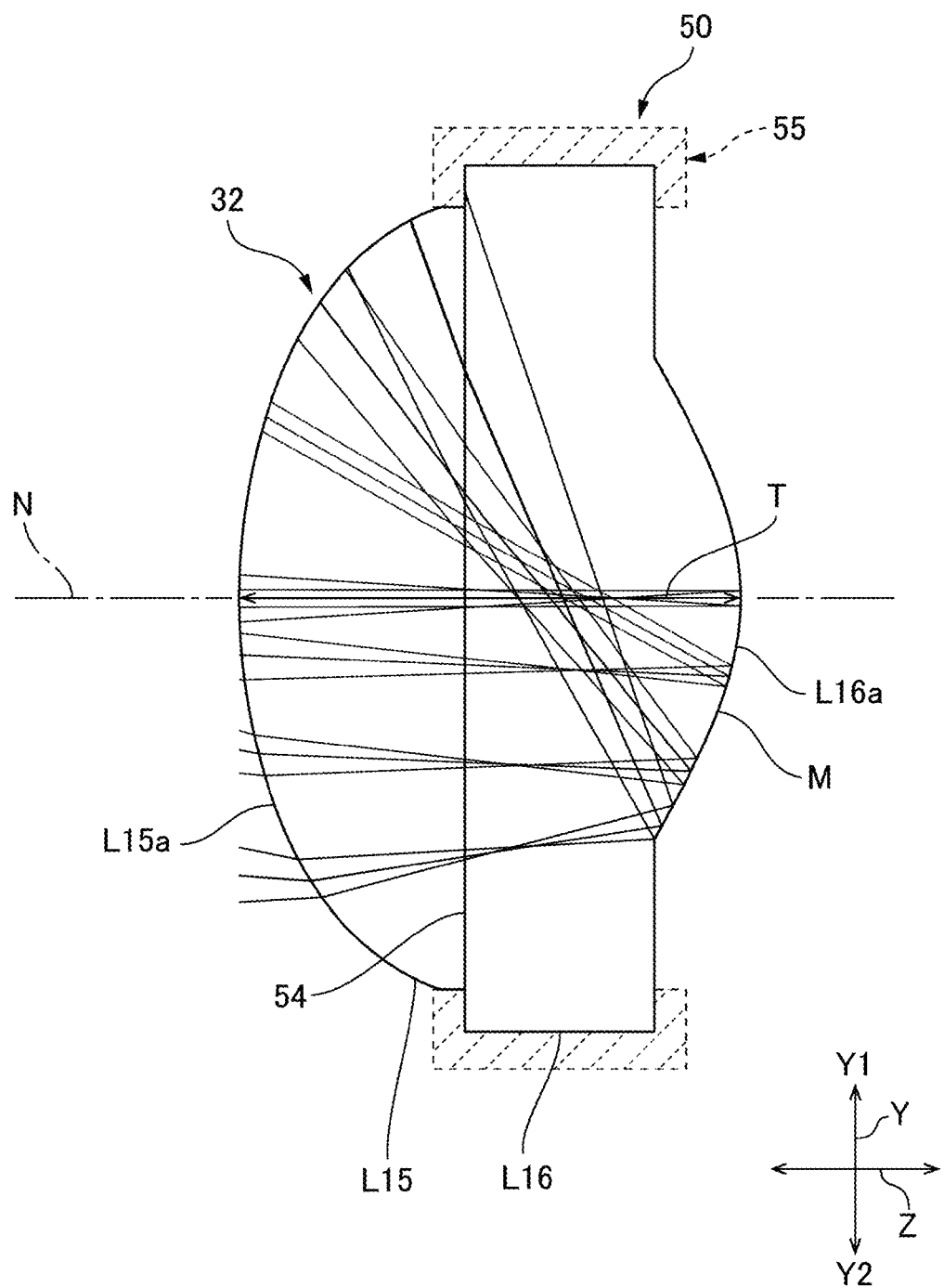
FIG. 21 is a ray chart of a second optical system in Practical Example 4.

FIG. 19 is a ray chart schematically showing a whole of a projection optical system according to Practical Example 4. FIG. 19 schematically shows the light beams which reach the screen S from the projection optical system 3B according to the present example with the light beams F1 through F3. FIG. 20 is a ray chart of the projection optical system according to Practical Example 4. FIG. 21 is a ray chart of a lens located by an enlargement-extreme side of a first optical system, a second optical system, and a third optical system. It should be noted that since the projection optical system 3B according to Practical Example 4 is provided with constituents corresponding to those of the projection optical system 3A described above, the description will be presented denoting the corresponding constituents by the same reference symbols.

As shown in FIG. 19, the projection optical system 3B according to the present example is constituted by the first optical system 31 and the second optical system 32 arranged in sequence from the reduction-side toward the enlargement-side. The first optical system 31 is a refracting optical system provided with a plurality of lenses. The second optical system 32 is the lens unit 50 having two lenses bonded to each other. As shown in FIG. 21, the second optical system 32 has the mirror M provided with the concavely curved surface. The projection optical system 3B forms an intermediate image 35 conjugate with a reduction-side imaging plane in the middle of the second optical system 32. Further, the projection optical system 3B forms a final image conjugate with the intermediate image 35 in an enlargement-side imaging plane.

By the reduction-side imaging plane, there is disposed the liquid crystal panel 18 of the image formation section 2. The liquid crystal panel 18 forms the projection image in the upper side Y1 of the optical axis N. The intermediate image 35 is formed in the lower side Y2 of the optical axis N. The screen S is located in the upper side Y1 of the optical axis N. The intermediate image 35 is an image vertically flipped in the Y-axis direction with respect to the enlarged image to be formed in the screen S.

The first optical system 31 has the cross dichroic prism 19, and the fourteen lenses L1 through L14. The first lens L1 through the 14-th lens L14 are arranged in this order from the reduction side toward the enlargement side. In the present example, the second lens L2 and the third lens L3 are bonded to each other to form a first jointed lens L21. The 4-th lens L4 and the 5-th lens L5 are bonded to each other to form a second jointed lens L22. The 9-th lens L9 and the 10-th lens L10 are bonded to each other to form a third jointed lens L23.

As shown in FIG. 21, the second optical system 32 is constituted by a 15-th lens L15 and a 16-th lens L16. The first jointing member 54a intervenes between the 15-th lens L15 and the 16-th lens L16. By an outer side in the redial direction of the 15-th lens L15 and the 16-th lens L16, there is disposed the adjustment mechanism 55 for adjusting and then keeping the distance T between a 15-th-lens lateral surface L15a at an opposite side to the 16-th lens L16 in the 15-th lens L15 and a 16-th-lens lateral surface L16a at an opposite side to the 15-th lens L15 in the 16-th lens L16. Further, the second optical system 32 has the mirror M provided with the concavely curved surface. The mirror M is a reflective coating layer provided to the 16-th-lens lateral surface L16a. The mirror M reflects the ray from the first optical system 31 toward the upper side Y1.

Lens Data

The lens data of the projection optical system 3B is as follows. The surface numbers are provided in sequence from the reduction side toward the enlargement side. The reference symbols are the reference symbols of the lenses and the mirrors. The data of the surface numbers not corresponding to any lenses or any mirrors are dummy data. The reference symbol R represents a curvature radius. The reference symbol D represents an axial surface distance. The reference symbol A represents an effective diameter. The units of R, D, and A are millimeter.

| REFERENCE SYMBOL | SURFACE NUMBER | SHAPE | R | D | GLASS MATERIAL | REFRACTION/ REFLECTION | A |
|---|---|---|---|---|---|---|---|
| | 0 | SPHERE | INFINITE | 5.0771 | | REFRACTION | 0.0000 |
| | 1 | SPHERE | INFINITE | 21.5089 | SBSL7 | REFRACTION | 7.6965 |
| | 2 | SPHERE | INFINITE | 3.0000 | | REFRACTION | 9.6301 |
| | 3 | SPHERE | INFINITE | 0.0000 | | REFRACTION | 10.0417 |
| 19 | 4 | SPHERE | INFINITE | 0.0000 | | REFRACTION | 10.0417 |
| | 5 | SPHERE | INFINITE | 0.0000 | | REFRACTION | 10.0417 |
| L1 | 6 | SPHERE | 54.8940 | 5.0419 | 451969.7922 | REFRACTION | 10.1721 |
| | 7 | SPHERE | −21.7949 | 0.1000 | | REFRACTION | 10.2241 |

-continued

| REFERENCE SYMBOL | SURFACE NUMBER | SHAPE | R | D | GLASS MATERIAL | REFRACTION/ REFLECTION | A |
|---|---|---|---|---|---|---|---|
| L2 | 8 | SPHERE | 38.0215 | 5.3428 | 483914.7992 | REFRACTION | 9.4314 |
| L3 | 9 | SPHERE | −17.1657 | 1.0000 | 838742.337 | REFRACTION | 9.0855 |
|  | 10 | SPHERE | −73.3538 | 0.1000 |  | REFRACTION | 8.9564 |
| L4 | 11 | SPHERE | 43.7198 | 4.6777 | 458568.7954 | REFRACTION | 8.6729 |
| L5 | 12 | SPHERE | −16.6916 | 1.0000 | 836961.3727 | REFRACTION | 8.3746 |
|  | 13 | SPHERE | 582.5473 | 0.1000 |  | REFRACTION | 8.3056 |
| L6 | 14 | SPHERE | 60.5198 | 2.4189 | 846663.2378 | REFRACTION | 8.2894 |
|  | 15 | SPHERE | −101.1944 | 0.1004 |  | REFRACTION | 8.1713 |
| L7 | 16 | SPHERE | −78.4977 | 2.5160 | 529212.7106 | REFRACTION | 8.1703 |
|  | 17 | SPHERE | −23.6259 | 11.0686 |  | REFRACTION | 8.1000 |
| O | 18 | SPHERE | INFINITE | 10.8450 |  | REFRACTION | 5.9273 |
| L8 | 19 | SPHERE | −11.1826 | 1.0000 | 457192.8527 | REFRACTION | 5.3000 |
|  | 20 | SPHERE | −14.2102 | 4.4064 |  | REFRACTION | 5.6852 |
| L9 | 21 | SPHERE | 21.2833 | 5.6421 | 621528.3349 | REFRACTION | 8.1133 |
| L10 | 22 | SPHERE | −14.5583 | 1.0000 | 838219.3417 | REFRACTION | 8.1514 |
|  | 23 | SPHERE | 19.4601 | 0.7648 |  | REFRACTION | 8.7013 |
| L11 | 24 | SPHERE | 29.6398 | 7.0827 | 608267.3465 | REFRACTION | 8.7391 |
|  | 25 | SPHERE | −12.2091 | 0.1000 |  | REFRACTION | 9.2494 |
| L12 | 26 | SPHERE | −12.8956 | 1.0000 | 755000.5232 | REFRACTION | 9.1962 |
|  | 27 | SPHERE | −110.0697 | 0.9959 |  | REFRACTION | 10.6854 |
| L13 | 28 | ASPHERIC SURFACE | 16.8297 | 3.5898 | E48R_ZEON | REFRACTION | 12.9970 |
|  | 29 | ASPHERIC SURFACE | 21.1795 | 10.1838 |  | REFRACTION | 13.5215 |
| L14 | 30 | ASPHERIC SURFACE | −164.8780 | 3.5898 | E48R_ZEON | REFRACTION | 15.6318 |
|  | 31 | ASPHERIC SURFACE | 38.8134 | 1.0000 |  | REFRACTION | 16.5107 |
|  | 32 | SPHERE | INFINITE | 0.0000 |  | REFRACTION | 16.1444 |
| L15 | 33 | ASPHERIC SURFACE | 33.1742 | 12.0355 | Z330R_ZEON | REFRACTION | 15.9142 |
| L16 | 34 | SPHERE | INFINITE | 14.7119 | EFEL1 | REFRACTION | 13.9140 |
| M | 35 | ASPHERIC SURFACE | −13.8214 | 0.0000 | EFEL1 | REFLECTION | 12.8228 |
| L16 | 36 | SPHERE | INFINITE | −14.7119 | EFEL1 | REFRACTION | 21.8507 |
| L15 | 37 | SPHERE | INFINITE | −12.0355 | Z330R_ZEON | REFRACTION | 21.4485 |
|  | 38 | ASPHERIC SURFACE | 33.1742 | −65.8130 |  | REFRACTION | 21.1755 |
|  | 39 | SPHERE | INFINITE | −56.8385 |  | REFRACTION | 294.3897 |
|  | 40 | SPHERE | INFINITE | −180.0883 |  | REFRACTION | 493.6966 |
|  | 41 | SPHERE | INFINITE | 0.0000 |  | REFRACTION | 1125.1844 |

The aspherical coefficient of each of the aspheric surfaces is as follows.

| SURFACE NUMBER | 28 | 29 | 30 | 31 |
|---|---|---|---|---|
| Y CURVATURE RADIUS | 16.8296875 | 21.17946978 | −164.8779938 | 38.81338024 |
| CONIC CONSTANT (K) | −0.164206666 | −7.634008001 | 90 | 0 |
| 4-th-ORDER COEFFICIENT (A) | −1.15543E−04 | −6.14677E−05 | −9.39007E−06 | −1.74055E−04 |
| 6-th-ORDER COEFFICIENT (B) | 1.00751E−07 | −2.60513E−07 | −4.62232E−07 | 3.89048E−07 |
| 8-th-ORDER COEFFICIENT (C) | −6.25176E−10 | 1.05249E−09 | 1.18170E−09 | −8.39080E−10 |

| SURFACE NUMBER | 33 | 35 | 38 |
|---|---|---|---|
| Y CURVATURE RADIUS | 33.17421232 | −13.82144938 | 33.17421232 |
| CONIC CONSTANT (K) | 1.424812957 | −3.41862312 | 1.424812957 |
| 4-th-ORDER COEFFICIENT (A) | −8.30393E−06 | −3.65499E−05 | −8.30393E−06 |
| 6-th-ORDER COEFFICIENT (B) | 8.68876E−09 | 3.27225E−07 | 8.68876E−09 |
| 8-th-ORDER COEFFICIENT (C) | 1.32570E−10 | −1.53172E−09 | 1.32570E−10 |
| 10-th-ORDER COEFFICIENT (D) | −4.27302E−13 | 3.26740E−12 | −4.27302E−13 |

| 12-th-ORDER COEFFICIENT (E) | 3.93005E−16 | | 3.93005E−16 |
|---|---|---|---|

Figure 22:
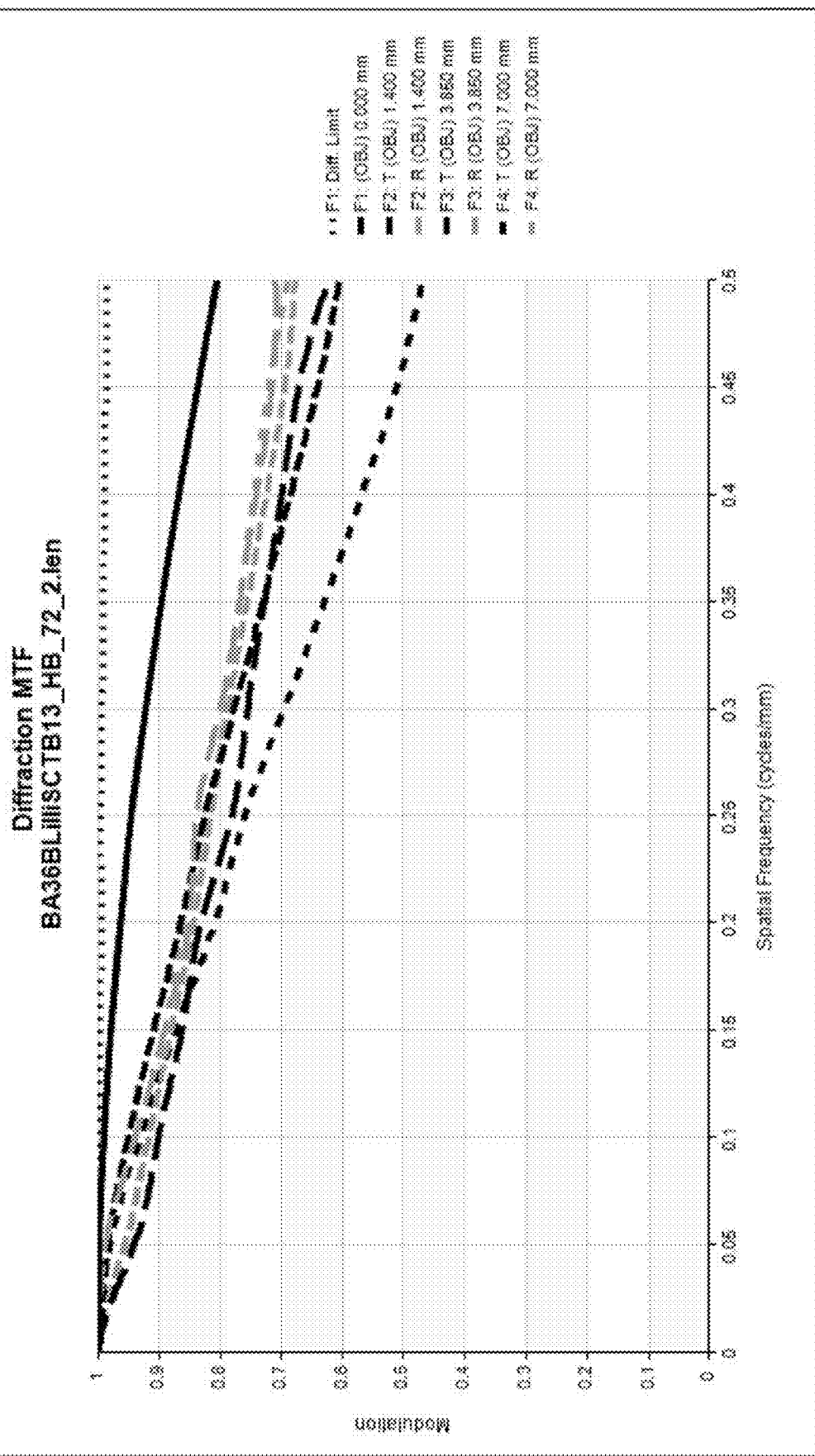
FIG. 22 is a diagram showing MTF by the enlargement-side of the projection optical system according to Practical Example 4.

FIG. 22 is a diagram showing MTF by the enlargement side of the projection optical system 3B.

Functions and Advantages

In the projection optical system 3B according to the present example, the second optical system 32 is formed of the lens unit 50 provided with the adjustment mechanism 55. Therefore, in the second optical system 32, it is possible to adjust the distance T between the 15-th-lens lateral surface L15a of the 15-th lens L15 and the 16-th-lens lateral surface L16a of the 16-th lens L16. Further, it is possible to achieve this adjustment while visually checking the final image. Therefore, it is possible to prevent the TV distortion from occurring in the final image, and thus, it is possible to prevent the distortion aberration from occurring in the final image. Further, by adjusting the distance T between the 15-th-lens lateral surface L15a and the 16-th-lens lateral surface L16a in the second optical system 32, it is also possible to suppress the distortion aberration presently occurring in the first optical system 31.

Projection Optical System According to Practical Example 5

Figure 23:
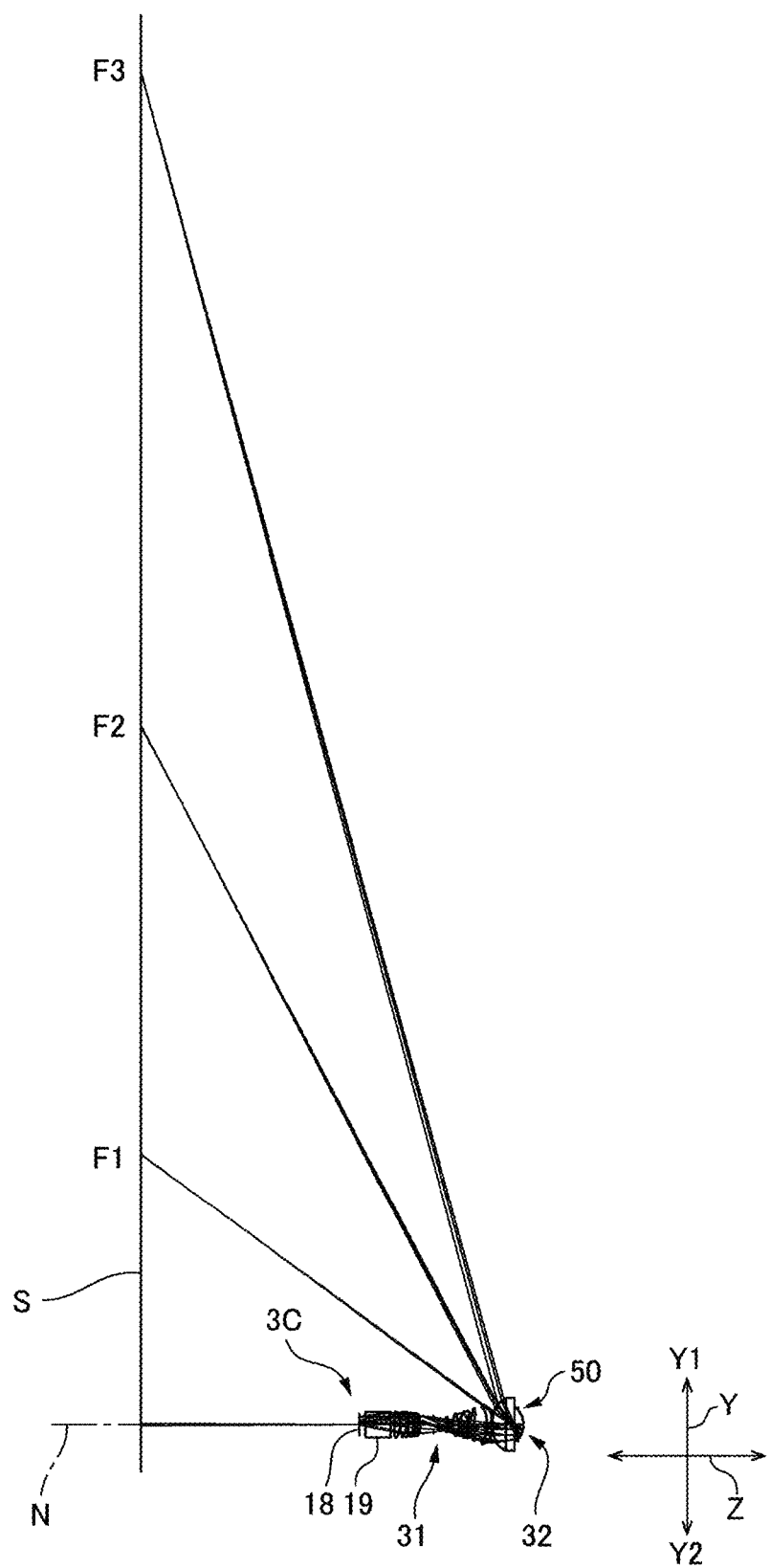
FIG. 23 is a ray chart schematically showing a whole of a projection optical system according to Practical Example 5.
Figure 24:
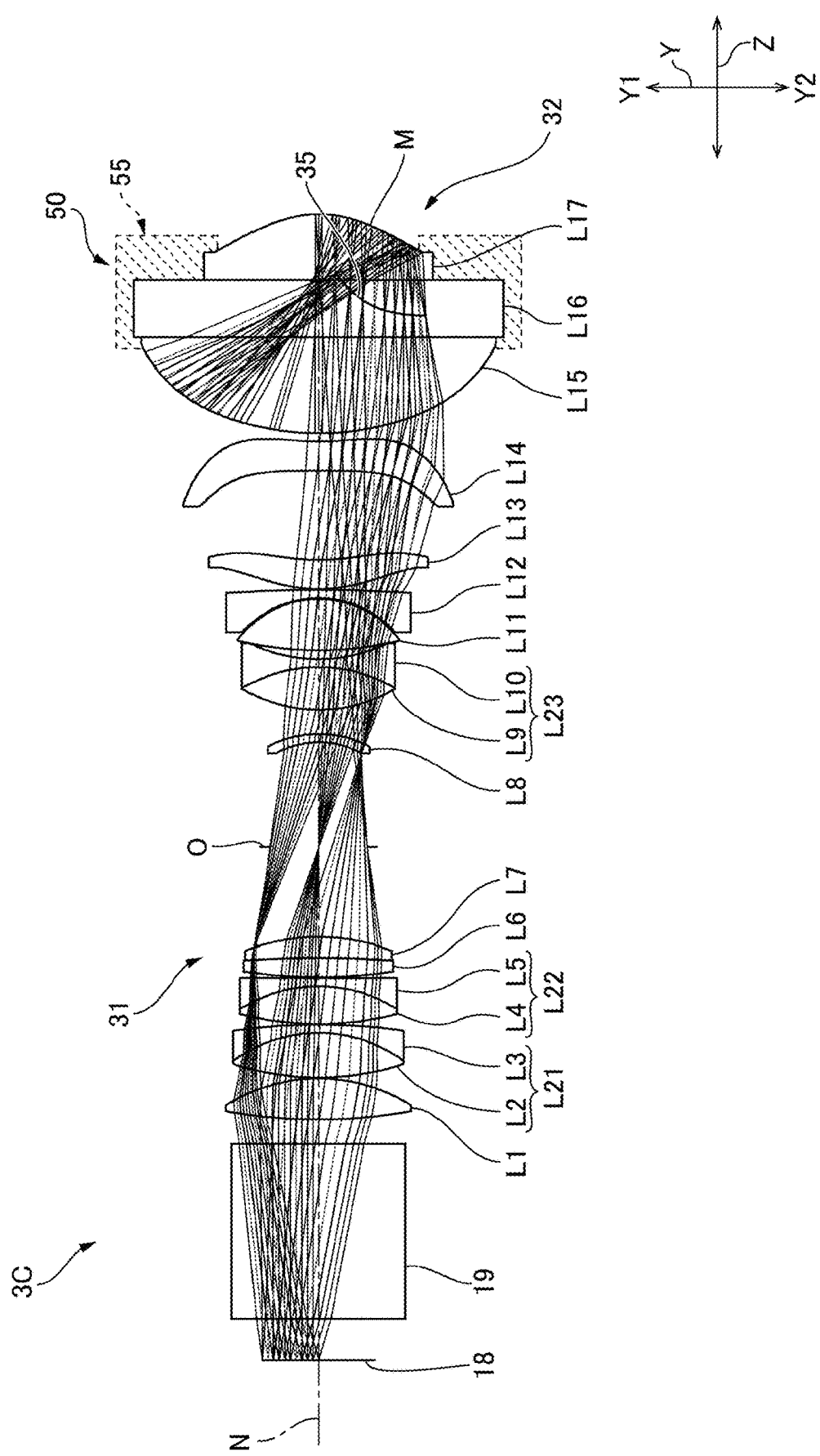
FIG. 24 is a ray chart of the projection optical system according to Practical Example 5.
Figure 25:
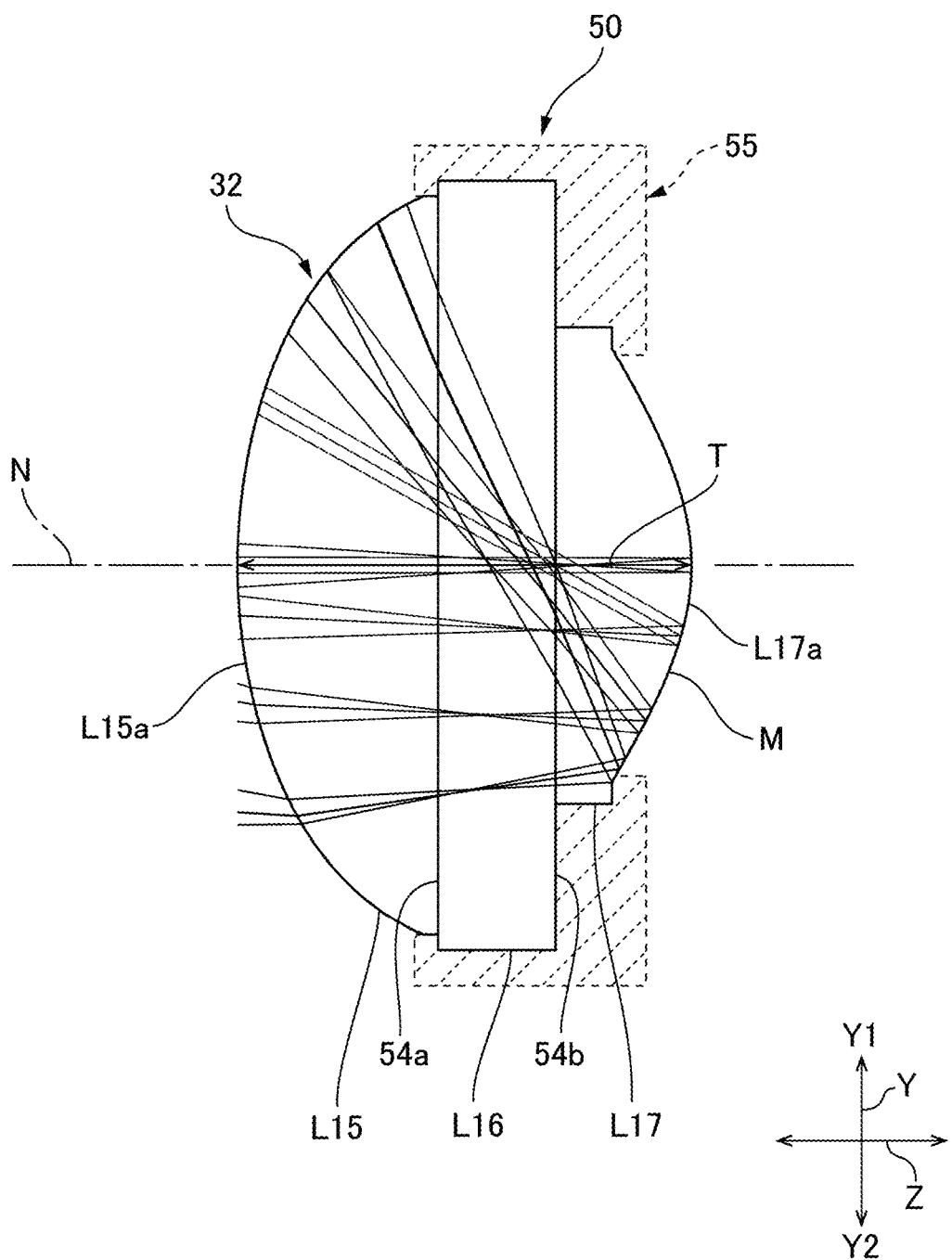
FIG. 25 is a ray chart of a second optical system in Practical Example 5.

FIG. 23 is a ray chart schematically showing a whole of a projection optical system according to Practical Example 5. FIG. 23 schematically shows the light beams which reach the screen S from the projection optical system 3C according to the present example with the light beams F1 through F3. FIG. 24 is a ray chart of the projection optical system according to Practical Example 5. FIG. 25 is a ray chart of a second optical system. It should be noted that since the projection optical system 3C according to Practical Example 5 is provided with constituents corresponding to those of the projection optical systems 3A and 3B described above, the description will be presented denoting the corresponding constituents by the same reference symbols.

As shown in FIG. 23, the projection optical system 3C according to the present example is constituted by the first optical system 31 and the second optical system 32 arranged in sequence from the reduction-side toward the enlargement-side. The first optical system 31 is a refracting optical system provided with a plurality of lenses. The second optical system 32 is the lens unit 50 having three lenses bonded to each other. As shown in FIG. 24, the second optical system 32 has the mirror M provided with the concavely curved surface. The projection optical system 3C forms the intermediate image 35 conjugate with the reduction-side imaging plane in the middle of the second optical system 32. Further, the projection optical system 3C forms the final image conjugate with the intermediate image 35 in the enlargement-side imaging plane.

By the reduction-side imaging plane, there is disposed the liquid crystal panel 18 of the image formation section 2. The liquid crystal panel 18 forms the projection image in the upper side Y1 of the optical axis N. The intermediate image 35 is formed in the lower side Y2 of the optical axis N. The screen S is located in the upper side Y1 of the optical axis N. The intermediate image 35 is an image vertically flipped in the Y-axis direction with respect to the enlarged image to be formed in the screen S.

The first optical system 31 has the cross dichroic prism 19, and the fourteen lenses L1 through L14. The first lens L1 through the 14-th lens L14 are arranged in this order from the reduction side toward the enlargement side. In the present example, the second lens L2 and the third lens L3 are bonded to each other to form the first jointed lens L21. The 4-th lens L4 and the 5-th lens L5 are bonded to each other to form the second jointed lens L22. The 9-th lens L9 and the 10-th lens L10 are bonded to each other to form the third jointed lens L23.

As shown in FIG. 25, the second optical system 32 is constituted by a 15-th lens L15, a 16-th lens L16, and a 17-th lens L17. The first jointing member 54a intervenes between the 15-th lens and the 16-th lens, and the second jointing member 54b intervenes between the 16-th lens and the 17-th lens. By an outer side in the redial direction of the 15-th lens L15, the 16-th lens L16, and the 17-th lens L17, there is disposed the adjustment mechanism 55 for adjusting and then keeping the distance T between a 15-th-lens lateral surface L15a at an opposite side to the 17-th lens L17 in the 15-th lens L15 and a 17-th-lens lateral surface L17a at an opposite side to the 15-th lens L15 in the 17-th lens L17. Further, the second optical system 32 has the mirror M provided with the concavely curved surface. The mirror M is a reflective coating layer provided to the 17-th-lens lateral surface L17a. The mirror M reflects the ray from the first optical system 31 toward the upper side Y1.

Lens Data

The lens data of the projection optical system 3C is as follows. The surface numbers are provided in sequence from the reduction side toward the enlargement side. The reference symbols are the reference symbols of the lenses and the mirrors. The data of the surface numbers not corresponding to any lenses or any mirrors are dummy data. The reference symbol R represents a curvature radius. The reference symbol D represents an axial surface distance. The reference symbol A represents an effective diameter. The units of R, D, and A are millimeter.

| REFERENCE SYMBOL | SURFACE NUMBER | SHAPE | R | D | GLASS MATERIAL | REFRACTION/ REFLECTION | A |
|---|---|---|---|---|---|---|---|
| | 0 | SPHERE | INFINITE | 5.0771 | | REFRACTION | 0.0000 |
| | 1 | SPHERE | INFINITE | 21.5089 | SBSL7 | REFRACTION | 7.7525 |
| | 2 | SPHERE | INFINITE | 3.0000 | | REFRACTION | 9.8396 |
| | 3 | SPHERE | INFINITE | 0.0000 | | REFRACTION | 10.2842 |
| 19 | 4 | SPHERE | INFINITE | 0.0000 | | REFRACTION | 10.2842 |
| | 5 | SPHERE | INFINITE | 0.0000 | | REFRACTION | 10.2842 |
| L1 | 6 | SPHERE | 65.2535 | 5.0547 | 459231.8119 | REFRACTION | 10.4081 |
| | 7 | SPHERE | −21.5572 | 0.1000 | | REFRACTION | 10.4808 |

-continued

| REFERENCE SYMBOL | SURFACE NUMBER | SHAPE | R | D | GLASS MATERIAL | REFRACTION/ REFLECTION | A |
|---|---|---|---|---|---|---|---|
| L2 | 8 | SPHERE | 33.7121 | 5.5287 | 466801.7961 | REFRACTION | 9.6397 |
| L3 | 9 | SPHERE | −17.7888 | 1.0000 | 838592.34 | REFRACTION | 9.2943 |
|  | 10 | SPHERE | −76.9653 | 0.1000 |  | REFRACTION | 9.1655 |
| L4 | 11 | SPHERE | 39.5109 | 4.6487 | 449763.8088 | REFRACTION | 8.8624 |
| L5 | 12 | SPHERE | −18.1989 | 1.0000 | 836854.375 | REFRACTION | 8.5659 |
|  | 13 | SPHERE | 2344.7694 | 0.1000 |  | REFRACTION | 8.4650 |
| L6 | 14 | SPHERE | 60.9938 | 2.3391 | 846663.2378 | REFRACTION | 8.4276 |
|  | 15 | SPHERE | −135.2249 | 0.1027 |  | REFRACTION | 8.2862 |
| L7 | 16 | SPHERE | −97.0588 | 2.5154 | 503784.5221 | REFRACTION | 8.2856 |
|  | 17 | SPHERE | −24.9159 | 11.0686 |  | REFRACTION | 8.1000 |
| O | 18 | SPHERE | INFINITE | 12.9279 |  | REFRACTION | 6.0487 |
| L8 | 19 | SPHERE | −10.7625 | 1.0000 | 737044.5312 | REFRACTION | 5.3000 |
|  | 20 | SPHERE | −13.7917 | 2.9113 |  | REFRACTION | 5.7749 |
| L9 | 21 | SPHERE | 18.6067 | 5.2604 | 587629.3674 | REFRACTION | 8.1488 |
| L10 | 22 | SPHERE | −18.7692 | 1.0000 | 843594.2683 | REFRACTION | 8.1900 |
|  | 23 | SPHERE | 19.9365 | 1.0936 |  | REFRACTION | 8.6264 |
| L11 | 24 | SPHERE | 43.1388 | 6.3428 | 708049.282 | REFRACTION | 8.6290 |
|  | 25 | SPHERE | −12.4385 | 0.1000 |  | REFRACTION | 9.1114 |
| L12 | 26 | SPHERE | −12.7727 | 1.0000 | 755000.5232 | REFRACTION | 9.0592 |
|  | 27 | SPHERE | −175.0400 | 0.1000 |  | REFRACTION | 10.4570 |
| L13 | 28 | ASPHERIC SURFACE | 17.2789 | 3.5898 | E48R_ZEON | REFRACTION | 12.1337 |
|  | 29 | ASPHERIC SURFACE | 24.8934 | 10.9770 |  | REFRACTION | 12.4998 |
| L14 | 30 | ASPHERIC SURFACE | −162.0425 | 3.5898 | E48R_ZEON | REFRACTION | 14.2609 |
|  | 31 | ASPHERIC SURFACE | 32.6131 | 1.0000 |  | REFRACTION | 15.4862 |
|  | 32 | SPHERE | INFINITE | 0.0000 |  | REFRACTION | 15.4078 |
| L15 | 33 | ASPHERIC SURFACE | 33.8937 | 11.9019 | Z330R_ZEON | REFRACTION | 15.3575 |
| L16 | 34 | SPHERE | INFINITE | 7.0000 | EFEL1 | REFRACTION | 13.7122 |
|  | 35 | SPHERE | INFINITE | 8.0616 | Z330R_ZEON | REFRACTION | 13.0735 |
| L17, M | 36 | ASPHERIC SURFACE | −13.5088 | 0.0000 | Z330R_ZEON | REFLECTION | 12.8981 |
| L16 | 37 | SPHERE | INFINITE | −8.0616 | Z330R_ZEON | REFRACTION | 22.5140 |
|  | 38 | SPHERE | INFINITE | −7.0000 | EFEL1 | REFRACTION | 6.6445 |
| L15 | 39 | SPHERE | INFINITE | −11.9019 | Z330R_ZEON | REFRACTION | 16.2844 |
|  | 40 | ASPHERIC SURFACE | 33.8937 | −65.8130 |  | REFRACTION | 21.4543 |
|  | 41 | SPHERE | INFINITE | −56.8385 |  | REFRACTION | 299.7208 |
|  | 42 | SPHERE | INFINITE | −180.0883 |  | REFRACTION | 508.1933 |
|  | 43 | SPHERE | INFINITE | 0.0000 |  | REFRACTION | 1169.1953 |

The aspherical coefficient of each of the aspheric surfaces is as follows.

| SURFACE NUMBER | 28 | 29 | 30 | 31 |
|---|---|---|---|---|
| Y CURVATURE RADIUS | 17.27891973 | 24.89343087 | −162.042457 | 32.6131135 |
| CONIC CONSTANT (K) | 0.154036661 | −9.791011994 | 90 | 0 |
| 4-th-ORDER COEFFICIENT (A) | −1.14296E−04 | −6.32387E−05 | −3.30805E−05 | −2.08195E−04 |
| 6-th-ORDER COEFFICIENT (B) | 1.22744E−07 | −1.68865E−07 | −4.85441E−07 | 4.55554E−07 |
| 8-th-ORDER COEFFICIENT (C) | −8.35882E−10 | 8.66939E−10 | 1.36489E−09 | −9.60761E−10 |

| SURFACE NUMBER | 33 | 36 | 40 |
|---|---|---|---|
| Y CURVATURE RADIUS | 33.89369796 | −13.50883191 | 33.89369796 |
| CONIC CONSTANT (K) | 1.07073038 | −3.463988043 | 1.07073038 |
| 4-th-ORDER COEFFICIENT (A) | −7.60572E−06 | −3.68891E−05 | −7.60572E−06 |
| 6-th-ORDER COEFFICIENT (B) | 8.47827E−09 | 2.94214E−07 | 8.47827E−09 |
| 8-th-ORDER COEFFICIENT (C) | 1.32167E−10 | −1.38970E−09 | 1.32167E−10 |

| | | | |
|---|---|---|---|
| 10-th-ORDER COEFFICIENT (D) | −4.27006E−13 | 3.15769E−12 | −4.27006E−13 |
| 12-th-ORDER COEFFICIENT (E) | 4.32766E−16 | 4.32766E−16 | |

Figure 26:
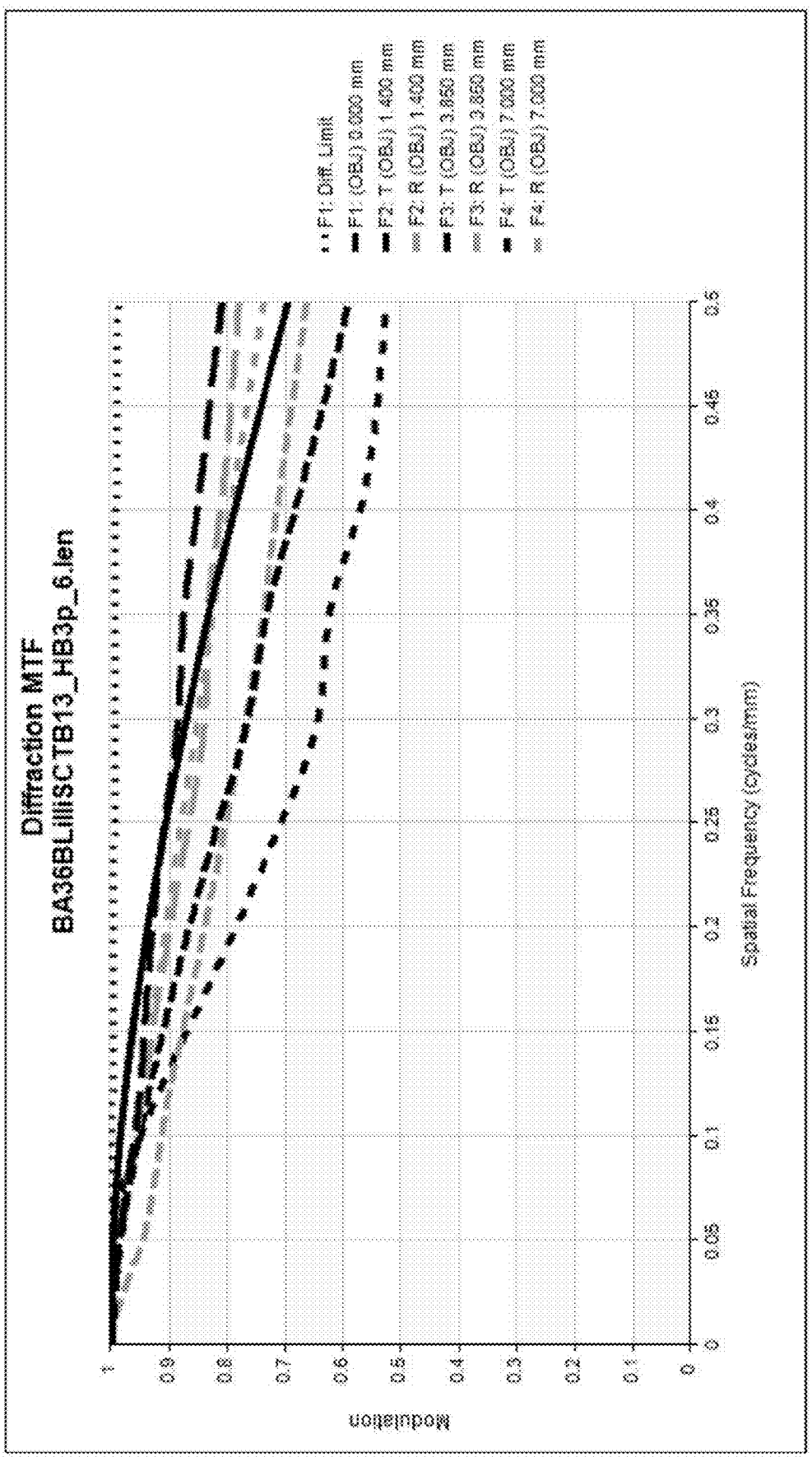
FIG. 26 is a diagram showing MTF by the enlargement-side of the projection optical system according to Practical Example 5.

FIG. 26 is a diagram showing MTF by the enlargement side of the projection optical system 3C.

Functions and Advantages

In the projection optical system 3C according to the present example, the second optical system 32 is formed of the lens unit 50 provided with the adjustment mechanism 55. Therefore, in the second optical system 32, it is possible to adjust the distance T between the 15-th-lens lateral surface L15a of the 15-th lens L15 and the 17-th-lens lateral surface L17a of the 17-th lens L17. Further, it is possible to achieve this adjustment while visually checking the final image. Therefore, it is possible to prevent the TV distortion from occurring in the final image, and thus, it is possible to prevent the distortion aberration occurring in the final image. Further, by adjusting the distance T between the 15-th-lens lateral surface L15a and the 17-th-lens lateral surface L17a in the second optical system 32, it is also possible to suppress the distortion aberration presently occurring in the first optical system 31.

What is claimed is:

1. A lens unit comprising:
   a jointed lens having a first optical member, a second optical member disposed on an optical axis of the first optical member, and a jointing member having a light transmissive property and disposed between the first optical member and the second optical member; and
   an adjustment mechanism holding the first optical member and the second optical member and adjusting a distance between the first optical member and the second optical member along an optical axis direction of the optical axis, wherein
   the jointing member adheres to the first optical member and the second optical member in a deformable manner, and
   the adjustment mechanism adjusts the distance to change a thickness of the jointing member along the optical axis direction.

2. The lens unit according to claim 1, wherein the jointing member is an adhesive.

3. The lens unit according to claim 1, wherein the adjustment mechanism includes
   a first holding member configured to hold the first optical member at an inner circumferential side,
   a second holding member configured to hold the second optical member at an inner circumferential side,
   a first cylindrical member disposed at an outer side in a radial direction of the first and second holding members, and
   a second cylindrical member disposed at an outer side in a radial direction of the first cylindrical member,
   the first holding member has a first cam pin protruding toward an outer circumference side,
   the second holding member has a second cam pin protruding toward an outer circumference side,
   the first cylindrical member has a through hole which extends in the optical axis direction, and through which the first cam pin and the second cam pin are inserted,
   the second cylindrical member has a first cam groove and a second cam groove both extending in a circumferential direction,
   a distance between the first cam groove and the second cam groove along the optical axis direction changes along the circumferential direction,
   the first cam pin is inserted in the first cam groove via the through hole,
   the second cam pin is inserted in the second cam groove via the through hole, and
   the distance between the first optical member and the second optical member is changed by rotating the first cylindrical member and the second cylindrical member around the optical axis.

4. The lens unit according to claim 1, wherein the adjustment mechanism includes
   a first holding member configured to hold the first optical member at an inner circumferential side,
   a second holding member configured to hold the second optical member at an inner circumferential side,
   a first cylindrical member disposed at an outer side in a radial direction of the first and second holding members, and
   a second cylindrical member disposed at an outer side in a radial direction of the first cylindrical member,
   the first holding member has a first cam pin protruding toward an outer circumference side,
   the second holding member has a second cam pin protruding toward an outer circumference side,
   the first cylindrical member has
     a first cam groove which extends in a circumferential direction and through which the first cam pin is inserted, and
     a second cam groove which extends in the circumferential direction and through which the second cam pin is inserted,
   the second cylindrical member has a through hole extending in the optical axis direction,
   a distance between the first cam groove and the second cam groove along the optical axis direction changes along the circumferential direction,
   the first cam pin is inserted in the through hole via the first cam groove,
   the second cam pin is inserted in the through hole via the second cam groove, and
   the distance between the first optical member and the second optical member is changed by rotating the first cylindrical member and the second cylindrical member around the optical axis.

5. The lens unit according to claim 1, wherein the adjustment mechanism includes
   a first ring-like member disposed at an outer side in a radial direction of the first optical member,
   a second ring-like member disposed at an outer side in a radial direction of the second optical member,
   a first spring member disposed between the first optical member and the second ring-like member, and
   a second spring member disposed between the second optical member and the first ring-like member, the first ring-like member has a first contact surface which the first optical member makes contact with, and a first screw, the second ring-like member has a second contact surface which the second optical member makes contact with, and a second screw which screws together with the first screw to integrate the first ring-like member and the second ring-like member with each other, the first optical member has a first reference surface making contact with the first contact surface, the second optical member has a second reference surface making contact with the second contact surface, the first spring member presses the first optical member against the second ring-like member toward the first ring-like member to make the first reference surface make contact with the first contact surface, the second spring member presses the second optical member against the first ring-like member toward the second ring-like member to make the second reference surface make contact with the second contact surface, and the distance between the first optical member and the second optical member is changed by relatively rotating the first ring-like member and the second ring-like member around the optical axis.

6. The lens unit according to claim 1, wherein
the jointed lens has a rotation restrictor configured to prevent the first optical member and the second optical member from relatively rotating around the optical axis, the rotation restrictor includes
a first through hole disposed outside an effective ray range of the first optical member and penetrating the first optical member in the optical axis direction, and
a second through hole disposed outside an effective ray range of the second optical member and penetrating the second optical member in the optical axis direction, and the first through hole and the second through hole overlap each other when viewed from the optical axis direction.

7. The lens unit according to claim 1, wherein
the jointed lens has a rotation restrictor configured to prevent the first optical member and the second optical member from relatively rotating around the optical axis, and the rotation restrictor includes
a first rotation stopper which an external member makes contact with from a circumferential direction outside an effective ray range of the first optical member, and
a second rotation stopper which an external member makes contact with from the circumferential direction outside an effective ray range of the second optical member.

8. The lens unit according to claim 1, wherein
the jointed lens further includes a third optical member disposed between the first optical member and the second optical member on the optical axis, and the jointing member includes
a first jointing member disposed between the first optical member and the third optical member and adhering to the first optical member and the third optical member, and
a second jointing member disposed between the third optical member and the second optical member and adhering to the third optical member and the second optical member.

9. The lens unit according to claim 8, wherein
the jointed lens has a rotation restrictor configured to prevent the first optical member, the second optical member, and the third optical member from relatively rotating around the optical axis, the rotation restrictor includes
a first through hole disposed outside an effective ray range of the first optical member and penetrating the first optical member in the optical axis direction,
a second through hole disposed outside an effective ray range of the second optical member and penetrating the second optical member in the optical axis direction, and
a third through hole disposed outside an effective ray range of the third optical member and penetrating the third optical member in the optical axis direction, and the first through hole, the second through hole, and the third through hole overlap each other when viewed from the optical axis direction.

10. The lens unit according to claim 1, wherein
the jointed lens has a reflective coating layer provided to a lateral surface of the second optical member.

11. A projection optical system comprising:
the lens unit according to claim 1 disposed between a reduction-side imaging plane and an enlargement-side imaging plane.

12. The projection optical system according to claim 11, further comprising:
a first optical system; and
a second optical system disposed at an enlargement side of the first optical system, wherein
an intermediate image is formed inside the second optical system, and
the second optical system is formed of the lens unit.

13. A projector comprising:
a light source;
a light modulator configured to modulate light emitted from the light source to provide an image to the reduction-side imaging plane; and
a projection optical system according to claim 11 configured to project the image.

14. A projector comprising:
a light source;
a light modulator configured to modulate light emitted from the light source to provide an image to the reduction-side imaging plane; and
a projection optical system according to claim 12 configured to project the image.

* * * * *